US012088038B2

(12) United States Patent
Ding et al.

(10) Patent No.: US 12,088,038 B2
(45) Date of Patent: Sep. 10, 2024

(54) HOLDING FRAME FOR CONNECTOR

(71) Applicant: HARTING Electric Stiftung & Co. KG, Espelkamp (DE)

(72) Inventors: Chuansheng Ding, Zhuhai (CN); Yingtao Wang, Zhuhai (CN); Jingcai He, Zhuhai (CN); Heiko Meier, Minden (DE)

(73) Assignee: HARTING Electric Stiftung & Co. KG, Espelkamp (DE)

( * ) Notice: Subject to any disclaimer, the term of this patent is extended or adjusted under 35 U.S.C. 154(b) by 0 days.

(21) Appl. No.: 17/769,021

(22) PCT Filed: Oct. 16, 2019

(86) PCT No.: PCT/CN2019/111518
§ 371 (c)(1),
(2) Date: Apr. 14, 2022

(87) PCT Pub. No.: WO2021/072686
PCT Pub. Date: Apr. 22, 2021

(65) Prior Publication Data

US 2024/0106157 A1 Mar. 28, 2024

(51) Int. Cl.
*H01R 13/518* (2006.01)
*H01R 13/506* (2006.01)
*H01R 13/514* (2006.01)

(52) U.S. Cl.
CPC ......... *H01R 13/518* (2013.01); *H01R 13/506* (2013.01); *H01R 13/514* (2013.01)

(58) Field of Classification Search
None
See application file for complete search history.

(56) References Cited

U.S. PATENT DOCUMENTS 5,352,133 A 10/1994 Sampson
6,371,788 B1 * 4/2002 Bowling .............. H01R 13/639 439/701

(Continued)

FOREIGN PATENT DOCUMENTS

CN 201072828 6/2008
CN 205609835 U 9/2016

(Continued)

*Primary Examiner* — Tho D Ta
(74) *Attorney, Agent, or Firm* — Smartpat PLC

(57) ABSTRACT

A holding frame for connector includes different latch and spring elements on opposite side walls of a base frame attached and project with their respective guiding portion whose T- or L-shaped post. The guiding portion ensures through its catching funnel for a comfortable insertion of the connector modules in the correct polarization and thereby, and while holding the then in the holding frame latched connector modules, stabilizing the post. In the construction of the holding frame is a permutation of various latch and spring elements on the base frame by an interaction of their fixing contour with a fixing contour of the respective side wall of the base frame prevented. Due to the special shape of the latch and spring elements, a cable connection-side removal of a connector module is possible if the holding frame is already installed in a commercially available attachment housing.

20 Claims, 14 Drawing Sheets

(56) References Cited

U.S. PATENT DOCUMENTS

| | | | | |
|---|---|---|---|---|
| 7,316,591 | B2 * | 1/2008 | Ferderer ............. | H01R 13/506 439/716 |
| 9,577,365 | B1 * | 2/2017 | Herbrechtsmeier . | H01R 13/518 |
| 2016/0285194 | A1 | 9/2016 | Herbrechtsmeier | |
| 2018/0254578 | A1 * | 9/2018 | Herbrechtsmeier . | H01R 13/508 |
| 2019/0334278 | A1 | 10/2019 | Wolff et al. | |
| 2020/0251849 | A1 | 8/2020 | Tiemann et al. | |

FOREIGN PATENT DOCUMENTS

| | | | |
|---|---|---|---|
| CN | 205985533 | U | 2/2017 |
| CN | 109643866 | A | 4/2019 |
| DE | 102013113973 | A1 | 6/2015 |
| DE | 102017118719 | A1 | 2/2019 |
| EP | 3067993 | A1 | 9/2016 |
| WO | 0191246 | A1 | 11/2001 |
| WO | 2017220736 | A1 | 12/2017 |
| WO | 2018192616 | A1 | 10/2018 |

* cited by examiner

HOLDING FRAME FOR CONNECTOR

TECHNICAL FIELD

The present disclosure relates to a holding frame for connector modules, and more particularly to a holding frame for a modular connector. The disclosure further relates to a system of a plurality of holding frames and a connector.

Such holding frames are also referred to as modular holding frames or as modular frames. They are used to accommodate several similar and/or different connector modules. These connector modules may be, for example, insulating bodies, which are provided as contact carriers for electronic and electrical and also for optical and/or pneumatic contacts and/or functional elements.

By means of such holding frames modular connectors can be provided in a simple and flexible way that are suitable for many different applications.

BACKGROUND

A comprehensive overview of various types of such holding frames can be found in the document WO 2017/220 0736 A1.

This document proposes, inter alia, a holding frame with a base frame and a deformation section, wherein a holding frame of this type allows increased flexibility in particular by separating of the material properties of the base body and the deformation section by suitable material combinations.

To specify, for example, a type of holding frame, which on the one hand has good heat resistance and high mechanical robustness and in particular allows a corresponding protective grounding when installed in a metallic connector housing, a base frame is preferably made by die casting, such as zinc or aluminum or a corresponding alloy for fixing a received connector module in a plane. On the base frame a deformation section is provided which can assume an insertion state and/or deformation state and a holding state and which can preferably be provided by means of a punching-bending technique of a resilient sheet metal.

The base frame defines and encloses a plane transverse to an insertion direction of a connector module. The insertion state of the deformation section thereby allows insertion of at least one connector module in a direction transverse to the plane of the base frame in the holding frame and fixing the received connector module in the holding state.

However, this known from the prior art holding frame has a limited user-friendliness, especially when it is equipped with individual connector modules and/or when replacing its connector modules in particular as intended e.g. already installed in a connector housing holding frame. In particular, even if the holding frame offers a predetermined correct orientation guide for the connector modules, a connector module at least partially inserted in the wrong orientation can lead to a connector module being stuck at an undesirable position of the holding frame and/or damage of the holding frame and/or the connector modules due to faulty assembly.

In addition, the holding frame above known from WO 2017/220736 A1 is only limited comfortably composed of a base frame and the cheek parts and limited comfortably positioned at its intended position in a connector. As mentioned above, especially even if the holding frame offers a predetermined correct orientation guide for the connector modules, a faulty assembly of the holding frame can lead to damage in particular of its cheek parts and/or to jamming of a cheek part at an undesired position of the base frame.

Also it has been found disadvantageous in some applications in practice that, in the prior art, the replacement and/or insertion of individual connector modules in a connector housing, and in particular in one equipped with a holding frame connector housing is undesirably troublesome. Such a mounting housing can be attached, for example, to a wall opening of a device housing wall and in particular a wall of a control cabinet.

SUMMARY

The object of the disclosure is to provide a holding frame for connector modules and in particular a holding frame for a modular connector, which is particularly comfortable to use.

The object is solved by the features of the independent claims.

Advantageous embodiments are specified in the dependent claims and/or the following description.

A holding frame is provided for a connector for receiving and harboring holding and guiding contours having connector modules. The holding frame has a base frame with a first and second longitudinal side wall lying parallel to each other and at right angles thereto having two mutually parallel transverse walls. Furthermore, it has at least one first latch and spring element attached to the first side wall and at least one second latch and spring element attached to the second side wall.

The base frame with its transverse and side walls has a rectangular cross section. The cross-sectional area defines a plane transverse to an insertion direction of the connector modules. The holding frame is tangible in said insertion direction and is therefore designed to be open both at its cable connection end and opposite at its plug-side end, i.e. it has a plug-side opening and opposite thereto a cable connection side opening, these openings are of course made open.

Furthermore, the holding frame has the following features:

The preferably integral latch and spring elements each have at least one, preferably a plurality of independently reversibly bendably formed and/or arranged holding and guiding portions for insertion of each connector module and for holding the inserted connector module and a fixing portion for fixing the respective latch and spring element on a side wall.

At each holding and guiding portion, a locking means is formed, which has a holding contour which is formed with the holding and guiding contour of a connector module correspondingly such that the holding and guiding contour of the connector module inserted into the holding frame is latched with the retaining contour, while the connector module is held in the holding frame.

The side walls and/or the latch and spring elements are arranged and/or formed such that a cable connection-side insertion and removal of the connector module from the holding frame installed in a mounting housing of the connector is made possibility.

Such a mounting housing is currently commercially available and well-known to those skilled, which connector housing is designed open not only on the plug side but also on the cable connection side. Such a mounting housing can be attached, for example, to a wall opening of a device housing or a control cabinet. Usually it has a screw-on flange and furthermore locking means, e.g. a locking bracket, for locking a connector with a matching mating connector.

Said locking means may in particular have a latching window and/or be formed by a latching window. The holding contour can be formed correspondingly with the holding and guiding contour transversely to the insertion direction and in particular with an edge of the locking window extending transversely to the insertion direction with the holding and guiding contour of a connector module.

The base frame can be formed with its transverse and side walls, for example, and advantageously produced by die casting, for example, made of zinc or aluminum or a corresponding alloy for fixing of a received connector module. The latch and spring elements attached to the side walls are suitably designed such that they can assume an insertion state and a holding state. The latch and spring elements can be provided in particular by means of a spring-elastic sheet machined by stamping and bending, wherein the holding and guiding portions of the latch and spring elements can be designed in particular as spring-elastic tabs.

The holding and guiding contours of a connector module can be formed in particular by substantially cuboid latching lugs, of which each connector module has two, which are arranged on opposite sides of the connector module. In particular, they can differ in their shape, in particular width, in order to ensure a polarizability of the modules and thus prevent miss-insertion. The holding and guiding contour can therefore be part of such a latching lug.

The above-described corresponding configuration of the retaining contour of the locking means with the holding and guiding contour of the connector module refers to, as in the entire context of the application, a dimension of the holding contour of the locking means with the corresponding dimension of the holding and guiding contour of the connector module particularly transverse to the insertion direction.

The holding frame has the particular advantage that it is particularly comfortable to provide.

The holding frame also has the particular advantage that it is particularly comfortable to assemble.

The holding frame also has the particular advantage that it is particularly easy to install.

The holding frame with the above features is designed such that it can accommodate at least two connector modules simultaneously by having at least one latch and spring element on each side wall, which has at least two holding and guiding portions in a preferred embodiment. Alternatively or additionally, the holding frame can also accommodate a so-called "double module". Such a "double module" well known to the skilled person differs from the aforementioned connector module by its dimensions—it is usually about twice as wide—and in addition it has two holding and guiding contours on two opposite sides respectively instead of just one holding and Guiding contour, as it corresponds to the aforementioned, conventional connector module.

Thus, said double module has two such holding and guiding contours, in particular in the form of two latching lugs, which have this holding and guiding contour. For the sake of clarity, said dual module is here and below by definition not covered by the term "connector module", although it performs a similar function, because it occupies two slots in the holding frame, which are each provided for a connector module.

Such a double module can, e.g. find use, if e.g. very high currents are transmitted and thereby one or more contact pins and/or contact sockets with a particularly large cross-section, e.g. >0.8 mm must be received.

The fact that each of the at least two latch and spring elements preferably has at least two holding and guiding portions, in particular elastic tabs in the form of a punch out of sheet metal and bent into the desired shape, i.e. realized in the form of so-called "punch and bent parts", has special manufacturing and stability advantages. For example, latch and spring elements with multiple tabs are cheaper to manufacture and easier to install on the base frame, as is the case with a correspondingly larger number of latch and spring elements, which accordingly only have a single tab or even consist of a single tab. Although this design is hereby considered and expressly disclosed, due to the lack of stability of their attachment and/or the expense of their production, in practice they are rather of secondary interest.

The main advantage of a design in which each of the at least two latch and spring elements, i.e. at least two holding and guiding portions, has e.g. tabs, lies in the stability with which it is held on the respective side wall of the holding frame. In particular, this applies to the effects of a so-called "play", by which for example for attachment methods such as locking and/or folding, which is known to include "seam", and/or held by rivets on the holding frame. In particular, form fittingly encompassing described as follows of at least a section of a side wall by two legs of a fixing portion of the latch and spring element is emphasized because it provides a large-scale attachment with little effort and thus a particularly good ratio of holding force to the associated individual fastening moments. Alternatively or additionally, further, in particular said further attachment methods can be used in a stabilizing manner. In this case, furthermore, the latching on an additional locking element should be emphasized, because this attachment method is also reversible, so the latch and spring element is reversibly releasably held by a combination of encompassing and said latching on the base frame.

Due to the associated, large dimensions of these latch and spring elements, which have a plurality of holding and guiding portions, possibly occurring "play" has a much lower impact, for example, a slight rotational movement of the latch and spring element parallel to the side surface at the it is attached. Furthermore, the forces are distributed on the preferred plurality of fastening means, which hold the latch and spring element on the side wall of the base frame.

Alternatively or in addition to the aforementioned attachment methods, the latch and spring element can also be welded, soldered, glued, riveted, in particular embossed, and/or screwed to the base frame.

Thus, the holding frame can simultaneously accommodate at least two connector modules and/or at least one dual module. Holding frames with more than two slots are also comprised which thus accommodate a dual module and additionally one or more connector modules.

The modular holding frame can have at least 2, 3, 4, 5, 6, 7, . . . , n slots and accommodate a corresponding number of connector modules. Thus, for example, the frame can also have exactly 2, 3, 4, 5, 6, 7, . . . , n slots and accommodate as many connector modules. The advantages of the respective number and/or composition become present in the respective application. Thus, the selection and compilation is left to the user. On the manufacturer side, a system of different holding frames is advantageously provided, which, in this respect, is preferably versatile and comfortable to handle.

Of course, the holding frame, which has two or more slots, is also able to accommodate only a single connector module, for example such that at least one other slot remains unoccupied. However, this form of use of the holding frame does not exploit the major advantages of a connector modular system and is only one possible option for very specific applications.

In a holding frame, in particular the holding and guiding portion of the latch and spring elements may be formed and/or arranged such that a bending and/or spreading of the holding and guiding portions during insertion and removal of a connector module and in particular a latching of a Connector module with the locking means and in particular with the locking window even with the installed holding frame is possible.

The holding and guiding portion is suitably designed and/or arranged such that for said insertion and removal of a connector module in particular the holding and guiding portion is brought into a reversibly tensioned operating state, while the holding and guiding portion without a connector module and/or in the operating state in which the latching means, in particular the latching window is latched with a connector module, is brought into a relaxed or at least relatively relaxed state.

The holding and guiding portion can advantageously be designed and/or arranged such that a bending point of the holding and guiding portion for reversible bending of the holding and guiding portion is arranged adjacent to an upper edge of the side wall in the insertion direction. In this case, a region of the holding and guiding portion can have a stiffening, so that the region having the stiffening has an increased stiffness relative to the bending point.

The stiffening and/or the bending point of the holding and guiding portion can be advantageously arranged and/or formed such that when spreading and/or bending of the holding and guiding portion to the outside for insertion and removal of the connector module, a shift of the holding and guiding portion is minimized transversely to the insertion.

If the latch and spring element is a punch and bent part, which is punched in particular from a resilient sheet metal, then this rigidity can be achieved by deformation, in particular by a recess, for example a recess e.g. an embossing, in particular an elongated U-shaped embossing in particular in the holding portion.

If, in another embodiment, the latch and spring element is made of plastic, for example, then the elasticity can be adjusted at this point by way of the material thickness of the respective section in connection with the material composition of the plastic.

By at least one of these measures, the bending point of the holding and guiding portion is advantageously spaced in particular from the guiding portion and the locking means, in particular the locking window, whereby the holding and guiding portion in particular during insertion of the connector module in the holding frame and/or in the latching of the connector module having the latching means, in particular the latching window, and when removing the connector module from the holding frame has an advantageous particularly suitably reversible bending behavior optionally also over a plurality of insertion and removal cycles.

As a result of this displacement of the bending point away from the cable connection side and towards the plug-in side, the cable connection-side insertion and removal of connector modules is also advantageously favored in a mounting frame already installed in a mounting housing. Actually, in the installed state only very little space for bending and/or spreading of the holding portion of the latch and spring element is available, so that a homogeneous curvature over the region of the holding and guiding portion would be extremely disadvantageous in this regard. However, precisely this is prevented or at least reduced to a sufficient extent by the generation and displacement of the bending point in the direction of the plug-side end, by means of said embossment. Instead, when spreading and/or bending the holding and guiding portion to the outside for insertion and removal of the connector module, the space requirement is minimized by the displacement of the holding and guiding portion substantially parallel to the side wall of the base frame.

The first and second side wall may have, in particular for enabling the projecting bending and/or spreading of the holding and guiding portion to the outside, a latching area with a suitable side contour. In this case, the holding and guiding portion suitably has a holding portion with a side contour which is designed to correspond with the side contour of the latching area such that said bending and/or spreading of the holding and guiding portion and also the below described extension of the holding portion into the rest area is possible.

The holding and guiding portion may have a first curvature and/or bending, and said side contour of the holding portion may suitably be formed corresponding to the side contour of the latching area such that the holding portion in the relaxed operating state and for a latched connector module with the locking means, in particular the latching window, extends by a predetermined amount in the latching area.

Said side contours of the latching area and of the holding portion of the latch and spring element are suitably matched to one another in such a way that the holding frame has an advantageous desirable stability, wherein the protruding holding portion extending into the latching area is arranged to support itself onto two adjacent posts of the side wall, which limit the side contour of a respective latching region transverse to the insertion direction.

The holding and guiding portion can advantageously also have a second curvature and/or bending, which is designed such that the holding portion extends opposite to the insertion direction in the latching region.

In the latching region of the side wall a base for supporting a latching element latched with latching means and in particular with the latching window of a connector module may further be arranged. In this case, the holding portion can have two opposing webs bent and/or angled extending from the fixing portion substantially opposite to the insertion direction and by means of the protruding first curvature and/or bending into the latching area. The webs are formed and/or arranged such that they limit the locking means transversely to the insertion direction and are each arranged adjacent to said posts of the side wall.

In this case, the latching means may preferably be a latching window. This can be formed for example by punching, if the latch and spring element is a punch and bent part. However, the locking means may be alternatively or additionally formed for example by a latch depression which is formed in the latching region. This can be, for example, by slitting and bending when the latch and spring element is said punch and bent part. But it can also be predetermined for example by an injection mold, if the latch and spring element is an injection molded part, which is e.g. made of plastic.

The webs suitably have the above-described stiffening of the holding and guiding portion for providing the region with increased rigidity. The stiffening provided on the webs may in particular be formed as embossing and extend along the webs. The stiffening of the webs is advantageously designed and arranged such that the bending point of the holding and guiding portion lies in the bending of the holding and guiding portion on the webs and adjacent to the upper edge of the side wall and also adjacent to the fixing portion and the base and may also be adjacent to the first curvature and/or bending of the holding and guiding portion.

By this measure, the bending point of the holding and guiding portion is advantageously spaced in particular from the guiding portion and cooperating with the base section of the locking means and in particular the latching window. As a result, the holding and guiding portion has an advantageous, in particular space-saving, reversible bending behavior, in particular also over a large number of insertion and removal cycles.

Due to the displacement of the bending point away from the cable connection side and towards the plug-in side, finally, the cable connection-side insertion and removal of connector modules already installed in a mounting frame is considerably favored. That is because, when installed, naturally only little space is available for unlocking.

According to a further embodiment, a holding frame may be provided with the features described above, on which at its free end in the insertion end of the holding and guiding portion of the latch and spring element a guiding contour is provided with which the holding and guiding contour of the connector module, in particular transversely to the insertion direction is designed to correspond such that an insertion of the connector module is made possible in the holding frame. This measure ensures that, even at the beginning of the insertion process, only a correctly oriented, with its holding and guiding contour, connector module can be inserted particularly in a holding frame already installed in a housing of a connector holding frame. The holding frame and/or the connector module are thus effectively protected against damage and/or tilting of a wrongly polarized inserted connector module.

The same applies to the corresponding design of the guiding contour with the holding and guiding contour of the connector module, as well as for the entire context of the application, what has been said above regarding the corresponding formation of the retaining contour with the holding and guiding contour of the connector module.

The holding and guiding portion may suitably have, in particular, a guiding portion which extends beyond the side wall in the opposite direction to the insertion direction. The holding and guiding portion may also have a third curvature and/or bending outwards, which is formed such that the guiding portion is set to the outside by a predetermined amount. By this measure, insertion of a connector module in the holding frame and in particular removal of a connector module from the holding frame is particularly simple even in the case of the already installed holding frame in a housing. Namely, the guiding portion having the above features is easily accessible also by hand when bending and/or spreading the holding and guiding portion for removing the connector module by means of suitable operation of the guiding portion.

The free end opposite the insertion of the connector module of the holding and guiding portion may in this case in particular advantageously have a fourth curvature and/or bending in the opposite direction to the third bend and/or curvature, i.e. inwardly.

The second and third curvature and/or bending can be particularly advantageously designed and/or arranged such that the holding and guiding portion extends in its area between the second and third curvature and/or bending substantially parallel to the insertion direction such that upon bending and/or spreading of the holding and guiding portion outwardly for insertion and removal of the connector module, a displacement of the holding and guiding portion extending between the second and third curvature and/or bending takes place substantially parallel and transversely to the insertion direction, Suitably, an insertion recess may be formed on the guiding portion, which has said guiding contour of the free-standing end of the holding and guiding portion, wherein the insertion recess may suitably have a further recess in the middle and/or in particular a chamfer formed as an inlet bevel, so that an advantageous catching funnel for the holding and guiding contour of the connector module is provided.

With these measures, a particularly easy and simple insertion of the connector module in the holding frame is possible. In particular, the chamfer allows insertion of the connector module only by inserting the connector module in the insertion recess and subsequent pressure on the connector module in the insertion direction, without any direct operation of the guiding portion.

The third and in particular fourth curvature and/or bending of the free-standing end of the guiding portion inserted opposite to the insertion direction projecting outwardly over the side wall of the base frame of the holding frame also allows an advantageous particularly simple insertion of the holding frame in a housing of a connector, in particular the insertion opening of the housing may also have a smaller dimension than the distance two outwardly projecting opposite guiding portions may have.

By means of the free-standing end, the holding and guiding portions of the latch and spring elements are advantageously bent inwardly during insertion of the holding frame, in particular in such a housing, wherein an edge of the insertion can slide particularly easily on the free-standing end of the holding and guiding portions, without catching or getting stuck.

Moreover, at the free-standing end, in addition to the fourth curvature and/or bending, an arc, in particular U-shaped, with two legs may be formed, with an elongated outer leg of the U-shaped bow being able to be turned in or out.

Incidentally, the bending of the holding and guiding portion of the latch and spring elements inwardly is directed in the opposite direction to the outward bending and/or spreading of the holding and guiding portion when inserting a plug connector module into the holding frame, and it is understood that the inward bending when inserting the holding frame in a housing is reversible due to the particular resiliently formed holding and guiding portions.

The above-described embodiments of the holding and guiding portions of the latching spring elements can advantageously be designed such that they protrude in the opposite direction to the insertion direction from the base frame. The guiding portions projecting beyond the side walls out of the base frame can advantageously be formed to extend transversely to the insertion direction and parallel to a side wall so that two adjacent guiding portions are arranged adjacent to each other in particular with their free-standing ends and/or arcs and having a predetermined small distance. The predetermined small distance can be suitably selected in such a way predetermined that it is significantly smaller than the holding and guiding contour of the connector modules. For example, the adjacent guiding portions may have a distance of less than 4 mm, in particular less than 3 mm, preferably less than 2 mm and particularly preferably less than 1 mm. By contrast, the holding contour can be wider at its widest point than 1 cm, in particular greater than 1.1 cm, preferably greater than 1.2 cm and particularly preferably greater than 1.4 cm. By this measure, on the one hand accidental insertion of a connector module between two adjacent holding and guiding portions is effectively prevented and it also facilitates a manual spreading of the holding and guiding portions.

The fixing portion may suitably be a slender U-shape with an outer and inner leg extending parallel and opposite to the insertion direction such that the fixing portion with its outer and inner legs engages around a lower edge of a side wall in a form-fitting manner such that the latch and spring element is fixed to the side wall of the base frame.

Suitably, the fixing portion may advantageously be arranged on the side wall such that the inner leg extends on the inside of the side wall, and the holding and guiding portion is formed on the outer leg. Also by this measure, the cable connection side insertion and removal of connector modules in an already built in a housing holding frame and an advantageous reversible bending behavior of the holding and guiding portion over a variety of insertion and removal cycles of a connector module from the holding frame is favorable.

Suitably, the outer leg may extend on the outer side of the side wall and, in particular, may advantageously have a fixing contour that is correspondingly formed with a fixing contour formed on the outside of the first and second side wall. The provision of the fixing contour particularly on the outside of the side wall allows a particularly reliable fixation of the latch and spring element on the side wall and in particular a particularly simple assembly of the side wall with the latch and spring element, after the fixing contour of the side wall and of the outer leg are visible during assembly.

The fixing contour may be provided by means of a lowered terrace formed on the outside of the side wall, wherein the fixing contour of the side wall and the fixing contour of the latch and spring element, for a particularly reliable fixation, may further have mutually corresponding elements such as mounting recesses and, in particular lockable, pins cooperating with the mounting recesses.

In addition, the first and second side wall may have a lowered recess formed on the inside of the side wall, which form fittingly corresponds with the inner leg of the fixing portion of the latch and spring element.

An advantageous embodiment particularly relates to a holding frame with the features described above, wherein the holding and guiding contour of the connector modules is formed by a first holding and guiding contour of the connector modules, and the connector modules have a second holding and guiding contour for the predetermined orientation arrangement of the connector modules in the holding frame.

The side contour of the latching region of the first side wall may be formed by a first side contour, while the side contour of the latching region of the second side wall is suitably different from the first side contour of the first side wall and is formed by a second side contour.

According to the first and second side contours of the first and second side walls, the side contour of the holding and guiding portion of the first latch and spring element may suitably be formed by a first side contour, while the side contour of the holding and guiding portion of the second latch and spring element may suitably be formed by a second side contour.

As described above, therefore, the first side contour of the first side wall is advantageously designed corresponding to the first side contour of the holding and guiding portion of the first latch and spring element such that the holding and guiding portion of the first latch and spring element can extend in particular in the latching area of the first side wall and in particular also can be bent reversibly outward through the latching area.

What has been said about the first side contour of the first side wall and the first side contour of the holding and guiding portion of the first latch and spring element applies analogously to the second side contour of the second side wall and the second side contour of the holding and guiding portion of the second latch and spring element.

In particular, the holding contour of the locking means (esp. latching window) of the holding and guiding portion of the first latch and spring element may be formed by a first holding contour, wherein said first holding contour of the first latch and spring element as described above is formed corresponding to the first holding and guiding contour of the connector modules.

Analogously to the above first holding contour of the first latch and spring element, the holding contour of the latching means (esp. latching window) of the holding and guiding portion of the second latch and spring element may be formed by a second holding contour, which is formed correspondingly to the second holding and guiding contour of the connector modules, as described.

Furthermore, the guiding contour of the free-standing end of the holding and guiding portion of the first latch and spring element may be formed by a first guiding contour, which is designed as described above, in particular transversely to the insertion direction corresponding to the first holding and guiding contour of the connector modules Analogously, the guiding contour of the free-standing end of the holding and guiding portion of the second latch and spring element can be suitably formed by a second guiding contour, which is suitably designed to correspond with the second holding and guiding contour of the plug connector modules, in particular transversely to the insertion direction.

The above embodiment is particularly advantageous after, by the features above, an exclusively correct orientational arrangement and/or polarization of the connector modules in the holding frame of this embodiment is possible beyond doubt and especially already in the initial stage of the insertion, so that insertion of a miss-oriented connector module is prevented from the outset.

An advantageous embodiment relates in particular to a holding frame, in which the fixing contour of the first side wall described above is formed by a first fixing contour, and the fixing contour of the second side wall is formed by a second fixing contour.

Suitably, the fixing contour of the fixing portion of the first latch and spring element is formed by a first fixing contour formed corresponding to the fixing contour the first side wall, and the fixing contour of the fixing area of the second latch and spring element formed by a second fixing contour with the fixing contour the second side wall is formed to correspond form fittingly.

The embodiment with the above features allows a particularly simple and unambiguous predetermined assembly of the side walls with their respective predetermined associated latch and spring elements.

A particularly advantageous embodiment has a holding frame with the features of the embodiment described above in combination with the features of the embodiment described above, which allows an exclusively correctly orientated arrangement of the connector modules in the holding frame.

The embodiment with said combination is particularly advantageous if it combines the aforementioned advantages of the above two embodiments wherein in particular an exclusively correctly orientated arrangement of the connector modules in the holding frame is made possible, and also false assembly of the side walls with the latch and spring elements is prevented.

This embodiment is also particularly advantageous because it makes it possible to easily and in particular also very flexibly form an optimized holding frame for a variety of applications, which can be assembled in a particularly simple manner.

In particular, the above embodiment can also advantageously have a multiplicity of first fixing contours provided on the first side wall and, suitably, also a multiplicity of first latch and spring elements with the first fixing contour of the fixing portion of the first latch and spring elements.

In particular, the above embodiment can advantageously have a multiplicity of second fixing contours provided on the second side wall and, suitably, a plurality of second latch and spring elements with the second fixing contour of the fixing portion of the second latch and spring elements.

In particular, the above embodiment can also have a plurality of latching regions of the first and second side walls and/or a multiplicity of holding and guiding portions formed spaced apart from one another on the first and/or second latch and spring elements.

The first and/or second latch and spring elements can also have a different number of holding and guiding portions.

The above plurality of latching regions can be advantageously provided by means of two spaced-apart posts, which are suitably designed and/or arranged such that they delimit a latching region transversely to the insertion direction.

The guiding portion of the holding and guiding portions protruding from the base frame opposite to the insertion direction can be designed and/or arranged, in particular in this embodiment, and also in the above and the embodiments described in the beginning, that a distance between the guiding portions of adjacent holding and guiding portions in particular between adjacent guiding portions of adjacent latch and spring elements is minimized. By these measures, a simple insertion of a connector module described above in the holding frame and/or a simple removal of a connector module is further favored.

For a better understanding of the embodiments abstractly described above, reference is made by way of example to the description of the figures of the embodiment of FIGS. 5A and 5B.

As mentioned above, in particular, the above embodiment is particularly suitable for easily and flexibly forming a holding frame optimized for a variety of applications, which can be assembled in a particularly simple manner.

Accordingly, the present disclosure also relates, in particular, to a kit for providing a holding frame with the features, in particular of the preceding embodiment, which enables a particularly flexible composition of a holding frame which is designed and built optimally for accommodating a predetermined number of connector modules in a simple manner.

The kit may suitably comprise the first side wall having a plurality of latching regions with the first side contour and one or more first fixing contours, and also comprising a second side wall having a plurality of latching regions with the second side contour and having one or more second fixing contours.

In addition, the kit may suitably comprise, in particular, one or more first latch and spring elements having a plurality of holding and guiding portions with the first side contour and the first fixing contour, and also one or more latch and spring elements having a plurality of holding and guiding portions with the second side contour and the second fixing contour.

A system of several such kits may include at least two such kits, wherein the plurality of latching regions and/or their plurality of first and second fixing contours and/or their plurality of holding and guiding portions may differ.

Unless otherwise stated in the foregoing description of a holding frame according to an embodiment of the invention and a suitable kit for providing a holding frame, the description relates to a holding frame and/or a side wall and/or a latch and spring element in a relaxed operating state of the latch and spring element.

The above-described first and second holding and guiding contours of a connector module can in particular be provided respectively by means of a suitably designed and arranged latch element, which can be designed substantially as a rectangular latch, wherein the latch may have bevels on one or more of its edges.

A holding frame of the above embodiments is in particular suitably designed with its latch and spring elements and its latching regions such that the locking element designed as a latching nose of the connector module is completely or partially received in a latching window, while the connector module is in its holding frame in an inserted and accommodated state.

The free-standing end of the guiding portion may be formed as a U-shaped arc, reference being made with respect to this embodiment by way of example to the corresponding description of the figures.

The holding frame may have a plurality of first and a plurality of second latch and spring elements, wherein both the first and the second latch and spring elements may have an equal and/or a different number of holding and guiding portions. As a result, many different holding frames are inexpensive to produce in production. For example, a holding frame with five slots on its first side wall having two first latch and spring elements, namely one with three holding and guiding portions and another with two holding and guiding portions.

Furthermore, the plurality of first latch and spring elements may each have one or more holding and guiding portions with the first side contour as well as the first fixing contour (K33'). At the same time, the plurality of second latch and spring elements can each have one or more holding and guiding portions with the second side contour as well as the second fixing contour. This ensures that the first and the second latch and spring elements are not interchanged with each other during assembly, and cannot be attached to the respective wrong side wall.

A system may include a plurality of holding frames that provide different number of slots for connector modules. This holding frame may have different numbers of first and second latch and spring elements. The latch and spring elements may have different numbers of holding and guiding portions ("tabs").

In summary, but not limiting, the following preferred embodiment is finally disclosed:

The mounting frame for connector modules is particularly easy to install and operate.

For this purpose, on both sides at least the two different latch and spring elements, namely the first and the second latch and spring element, attached to the two opposite side parts of the base frame, protrude with their respective guiding portion beyond the T or L-shaped posts of the two side panels.

Preferably, said guiding portion ensures, through its catching funnel, a comfortable insertion of the connector modules in the correct polarization and is each stabilized and supported on the posts, while also holding the latched connector modules in the holding frame. During assembly, a permutation of the various latch and spring elements on the base frame is prevented by interaction of their respective fixing contours with the corresponding fixing contours of the respective side wall of the base frame.

Due to the special shape of the latch and spring elements, a cable connection-side removal of a connector module is advantageously also possible if the holding frame is already installed in a connector housing, in particular a currently commercially available attachment housing.

BRIEF DESCRIPTION OF THE DRAWINGS

Embodiments of the invention are illustrated in the drawings and are explained in more detail below.

DETAILED DESCRIPTION

Figure 1A:
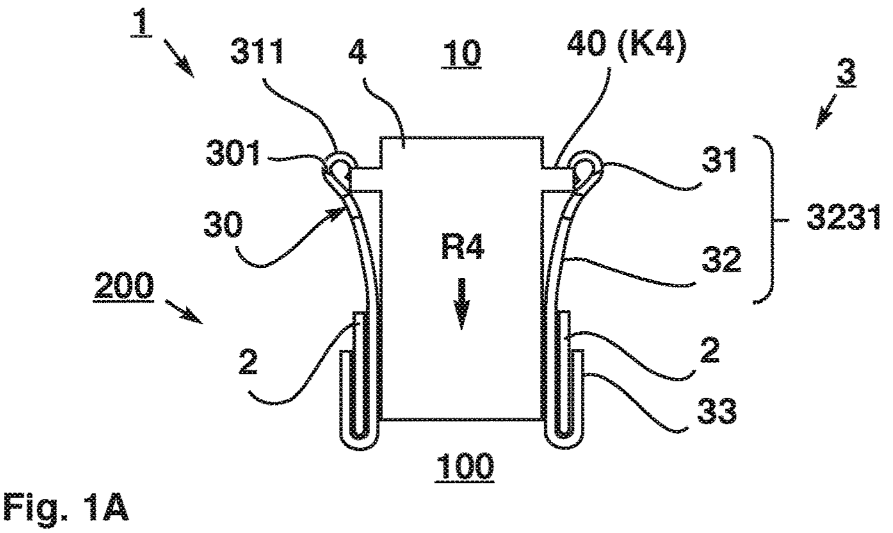
FIG. 1A shows a schematic section of a holding frame with two side walls of a base frame, two latch and spring elements and a partially inserted connector module.

The figures contain partially simplified, schematic representations. In part, identical reference numerals are used for the same but possibly not identical elements. For clarity, not all numerals are shown in each figure. Different views of the same elements could be scaled differently.

Figure 1B:
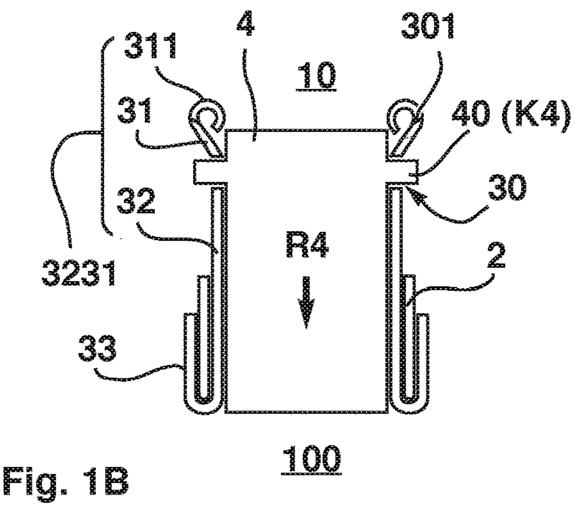
FIG. 1B shows the holding frame of FIG. 1A with an inserted connector module.

FIG. 1A shows a schematic section of a holding frame 1 according to an embodiment of the disclosure with a connector module 4 partially inserted via the cable connection-side opening 10, and FIG. 1B shows the holding frame 1 with the fully inserted connector module 4.

The holding frame 1 comprises a base frame 200 having two mutually parallel opposite side walls 2 with latch and spring elements 3 attached to the side walls 2. The base frame 200 defines a plane transverse to an insertion direction R4 of a connector module 4

The base frame 200 substantially has two opposite side walls 2, shown in the drawing and in the longitudinal direction of the base frame 200 extending and perpendicular to two opposing, not shown transverse walls 2B, wherein the base frame 200 may comprise further elements, not shown for clarity here, for mounting the base frame 200 on a housing or other components of a connector and/or a ground contact.

As mentioned above, the base frame 200 with the side walls 2 is preferably made by die casting, for example, made of zinc or aluminum or a corresponding alloy for fixing a received connector module 4 in a plane. The latch and spring elements 3 attached to the side walls 2 are formed such that they can assume an insertion state and a holding state, wherein the latch and spring elements 3 may preferably be provided by means of a punch bending technique processed resilient metal sheet.

Each latch and spring element 3 has a holding and guiding portion 3231 with a guiding portion 31 and a holding portion 32 and subsequently a fixing portion 33, which extends successively in the insertion direction R4. In the holding portion 32 also designed as a latching window 30 locking means are provided which have a retaining contour K30.

The fixing portion 33 of each latch and spring element 3 is slim U-shaped with two parallel extending legs formed and engages with its two legs, namely an outer leg and an inner leg to the lower edge of the side wall 2 of the base frame 200, that the latch and spring element 3 is fixed form fittingly on the side wall 2 of the base frame 200. The two legs of the U-shaped fixing portion 33 extend adjacent to the side wall 2 of the base frame 200 opposite to the insertion direction R4 of the connector module. 4

The outer leg is arranged on the outside of the side wall 2. At the inner leg of the U-shaped fixing portion 33 arranged on the inside of a side wall 2 of the base frame 200, the holding portion 32 of the latch and spring element 3 extends opposite to the insertion direction R4 beyond an upper edge of the side wall 2 of the base frame 200. Opposite to the insertion direction R4, the guiding portion 31, which has an outward curvature and/or bending, and its free-standing end 310 in the opposite direction to the protruding outward curvature and/or bending in a further curvature and/or bending section adjoining the holding portion 32 is bent back inwards. The guiding portion 31 of the latch and spring element 3 of the holding frame 1 according to this embodiment has, following the above inward curvature and/or bending, a U-shaped bend 311 at its free end 310, which can be considered as in essentially closed in this embodiment.

The connector module 4 is provided for equipping the holding frame 1 and suitably designed and has for this purpose suitable dimensions and two opposite walls, on each of which a latching lug 40 designed as a latch element is provided with a holding and guiding contour K4. The walls opposite to each other, each having a latching lug 40, of the connector module 4 are arranged and formed at a distance which corresponds to the distance of the latch and spring elements 3 provided with side walls 2 of the base frame 200 as described below. The holding and guiding contour K4 of the latching lugs 40 is, in this embodiment, formed corresponding to a holding contour K30 of the latching window 30 as described below. The connector module 4 of this embodiment is in fact held solely by means of the latching lug 40 latched with the holding contour K30 of the latching window 30 in the holding frame 1.

The guiding portion 31 of the latch and spring elements 3 has, as described above at its free-standing end 310 an inwardly bent and U-shaped bend 311. For particularly simple insertion of the connector module 4 in the holding frame 1 and in particular for the insertion of the latching lugs 40 in the latching window 30 formed as latching means of the latch and spring elements 3 is at the free-standing end 310, a centrally arranged insertion recess 301 is provided and described below, which has a suitably formed guiding contour K31 in the guiding portion 31, which corresponds to the holding and guiding contour K4 of the latching lugs 40 transverse to the insertion direction R4.

Figure 1D:
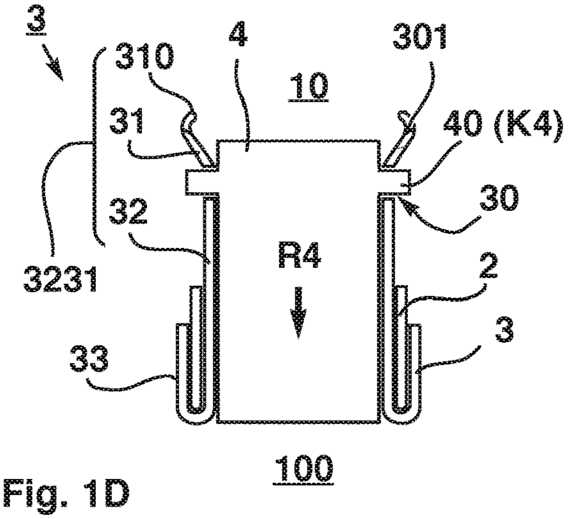
FIG. 1D shows the holding frame of FIG. 1B with a modified latch and spring element.
Figure 1C:
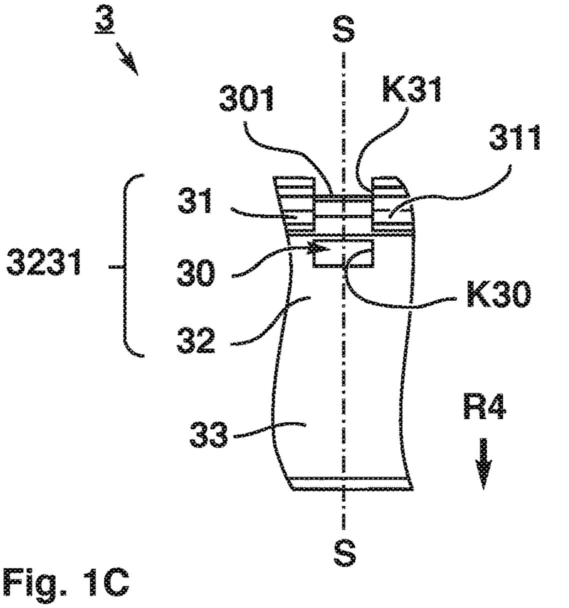
FIG. 1C shows a top view of a section of a latch and spring element of the holding frame of FIG. 1B seen from the interior of the holding frame.

This insertion recess can be seen particularly well in FIG. 1C. FIG. 1C shows a top view of a detailed view of a latch and spring element 3 of the holding frame 1 seen from the interior of the holding frame 1. The section through the holding frame 1 and in particular through the latch and spring element 3 of FIGS. 1A and B corresponds to a section through the line S-S.

When inserting the connector module 4, the latching lugs 40 of the connector module 4 are inserted into the insertion recesses 301. This already ensures that the connector module 4 is located in the correct polarization, i.e. in the desired orientation to the holding frame 1. Upon further insertion of the connector module 4 in the holding frame 1, the latching lugs 40 inserted into the insertion recesses 301 slide in the insertion R4 on the guiding portions 31 of the oppositely arranged latch and spring elements 3 and spread the latch and spring elements 3. This operating state of the holding frame 1 is shown in FIG. 1A.

In this operating state of the holding frame 1, the latch and spring elements 3 are bent outwardly, wherein the bending of the latch and spring elements 3 begins in the region of the holding portion 32, and wherein only the part of the latch and spring elements 3 is bent which extends, opposite to the insertion direction R4, above the upper edge of the side walls 2. With the already partially inserted connector module 4, the opposing latch and spring elements 3 between the side walls 2 of the base frame 200 and the connector module 4 are spatially determined, so that there is no or only a very small bend occurs.

In this embodiment, the holding frame 1 with the corresponding latching lugs 40 of the connector module 4 correspondingly formed locking means 30 having holding portions 32 of the latch and spring elements 3 are designed and arranged such that the connector module 4 fully inserted into the holding frame 1 is held by the latch and spring elements 3 and at least indirectly by the holding frame 1. In this case, the retaining contour K30 corresponds to the latching window 30 forming the locking means with the holding and guiding contour K4 of the latching lugs 40 of the connector module 4. The base frame 200 gives the holding frame 1 as a whole and thus indirectly the connector module 4 an additional level of stability and stiffness by holding the latch and spring elements 3 with its side walls 2.

In the above operating state of the holding frame 1, the connector module 4 is inserted into the holding frame 1 such that the latching lugs 40 of the connector module 4 extend through the latching windows 30 of the opposing latch and spring elements 3, so that the connector module 4 is held in the holding frame 1. The guiding portions 31 of the latch and spring elements 3 are, unlike in case of a partially inserted connector module 4, no longer spread by the latching lugs 40 of the connector module 4, and the latch and spring elements 3 are, in particular with their holding and guiding portions 3231, reset into a relatively relaxed state.

The latch and spring elements 3 and/or the side walls 2 of the base frame 200 may be formed such that the above operating state of the latch and spring elements 3 corresponds to an operating state of the latch and spring elements 3 without inserted and/or held connector modules 4.

The latch and spring elements 3 and/or the side walls 2 of the base frame 200 can also be designed such that, in the above-described operating state of the latch and spring elements 3, the holding and guiding portions 3231 are slightly spread open from the latching lugs 40 and/or the opposite side walls of the connector module 4, such that the guiding portions 31 and/or holding portions 32 of the latch and spring elements 3 exert a predetermined spring force on the opposite side walls of the connector module 4 inserted into the holding frame 1, which is substantially transverse to the insertion direction R4 and acts on the side walls 2.

The guiding portions 31, which are pointing outwardly by a predetermined amount, allow the ends of the latch and spring elements 3 to be grasped and spread apart at their guiding portions 31 for removal of the connector module 4, in particular even after the guiding portions 31 of the latch and spring elements 3 are opposite to the insertion direction R4 extend beyond the connector module 4 addition. Since the free-standing end of the guiding portion 31 has the bend 311 described above, only the sheet 311 and no edge of the guiding portion 31 is accessible, so that a particular injury-free detection and spreading of the latch and spring elements 3 by hand without tools is possible.

FIG. 1D shows the holding frame 1 with a modified latch and spring element 3 according to an embodiment, in which in particular the guiding portion 31 of the latch and spring element 3 also has an advantageous insertion recess 301 described above.

This latch and spring element 3 differs from the latch and spring element 3 described above in particular in that the free-standing end 310 of the guiding portion 31 has no bend 311 following its inward curvature and/or bending, but is free-standing. The guiding portion 31 has, with its free-standing end 310, a desirable distance from the connector module 4 and in particular its electrical contacts, which may be power contacts, and thus has a desirable advantageous electrical voltage resistance to possible air and/or creepage distances to electrical contacts of the connector module 4. The insertion recess 301 is formed in the free-standing end 310 of the guiding portion 31 following the inward curvature and/or bending described above.

Figure 1E:
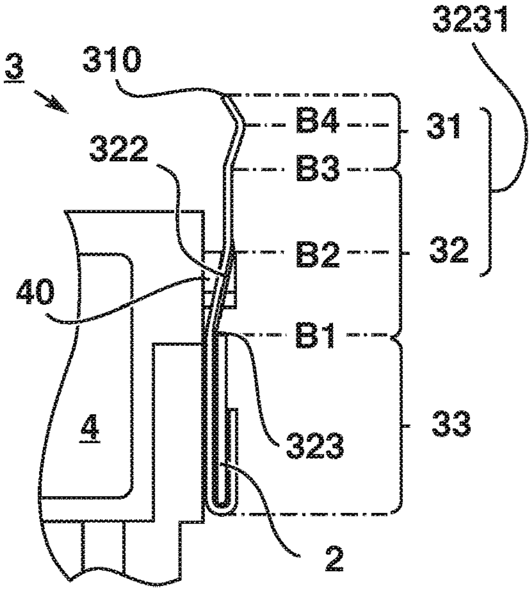
FIG. 1E shows the right side of the holding frame of FIG. 1D with a modified latch and spring element.

FIG. 1E shows one side of the base frame 200 with a latch and spring element 3 fixed and modified on the side wall 2.

The latch and spring element 3 of this embodiment differs from the latch and spring element 3 described above in particular in that the holding and guiding portion 3231 on the upper edge of the side wall 2 is, firstly, by a predetermined amount in a first curvature and/or bending B1 bent and/or angled to the outside, and then bent adjacent thereto to an upper edge of its latching window 30 in a second curvature and/or bending B2 by a predetermined amount in the opposite direction to the first curvature and/or bending B1, inwardly bent and/or angled, such that the holding and guiding portion 3231 extends in its further course advantageously substantially in the opposite direction to the insertion direction R4 and thus also substantially parallel to the side wall 2 of the base frame 200.

Following this, at the holding and guiding portion 3231, the guiding portion 31 is bent and/or angled outwards by a predetermined amount in a third curvature and/or bending B3 as described above and subsequently thereafter, as likewise described above, in a fourth curvature and/or bending B4 bent back inwardly and/or angled, and finally ends with its free-standing end 310.

Furthermore, the holding and guiding portion 3231 in the region of its locking means 30 designed as latching means on a stiffening 322, which may be provided by means of embossing, and which is formed such that a bending point 323 of the holding and guiding portion 3231 is arranged adjacent to the upper edge of the side wall 2 of the base frame 200 by its reversible bending, in particular when inserting and removing a connector module 4 in or out of the holding frame 1.

The holding and guiding portion 3231 with the features described above is in this case in particular abuts, with the upper edge of its latching window 30, on the latched latching lug 40 of the connector module 4 such that the holding and guiding portion 3231 during the insertion and removal of a connector module 4*th* are only minimally bent outward and/or shifted. The latch and spring element 3 with the holding and guiding portion 3231 with the above features is therefore particularly suitable for connector housings 5 with little space for bending and/or spreading, which can in particular be a mounting housing on a wall opening a wall of a cabinet or an electrical device.

A holding frame 1 with a protruding latch and spring element 3 is thus particularly suitable for removal and insertion of a connector module 4 into an already installed holding frame 1 in a protruding housing 5 of a connector. The latch and spring element 3 of the holding frame 1 has, like this the latch and spring element 3 described above, a free-standing end 310 extending against the insertion direction R4 which by means of the fourth curvature and/or bending B4 bends inwardly by a predetermined amount, which also has an advantageous electrical strength (air and/or creeping distances) as described above.

A holding frame 1 of the above embodiments is formed in particular with its latch and spring elements 3 such that the latch element 40 formed as a latch element of the connector module 4 in the holding frame 1 inserted and accommodated in its intended state completely or partially received by the locking means formed as the latching window 30.

Figure 2A:
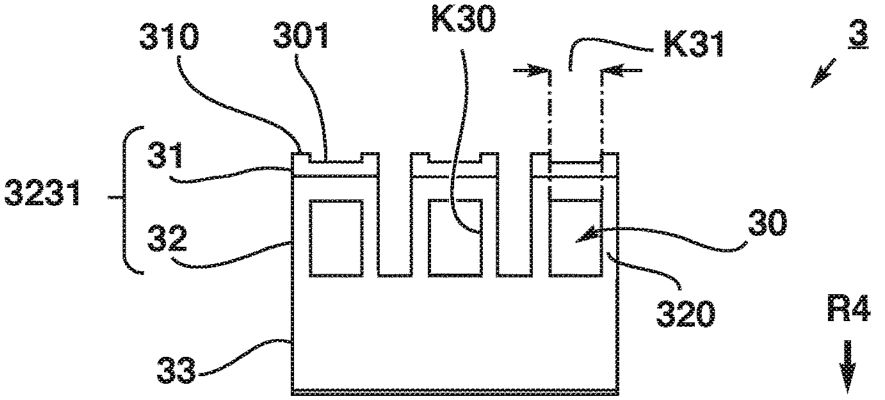
FIG. 2A shows a schematic representation of a suitable for a holding frame according to a further embodiment latch and spring element.
Figure 2B:
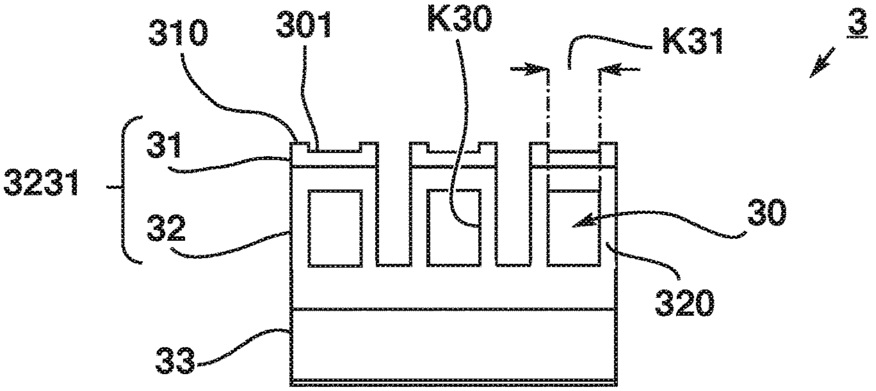
FIG. 2B shows the other side of the latch and spring element of FIG. 2A.

FIGS. 2A and 2B show a holding frame in a further embodiment.

FIG. 2A shows a schematic representation of a latch and spring element 3 suitable for a holding frame 1 according to an embodiment representing a view from the interior of a holding frame 1 having two opposite side walls 2 in the installed state of the latch and spring element 3. FIG. 2B shows this latch and spring element 3 from the other side, namely from the outside.

The latch and spring element 3 of this embodiment likewise has a fixing portion 33 bent in a U-shape for form fittingly fixing the latch and spring element 3 on a suitable side wall 2 of a base frame 200 of the holding frame 1. Unlike the latch and spring element 3 of the embodiments described above, the latch and spring element 3 of this embodiment has three spaced apart holding and guiding portions 3231, formed as identical tabs 3231 which can be bent open substantially independently. The holding and guiding portions 3231 formed as tabs 3231 each have a holding portion 32, a guiding portion 31 and a locking means formed as a latching window 30 and are of identical design, which is why hereinafter only one holding and guiding portion 3231 will be described.

Each holding portion 32 of the latch and spring element 3, respectively, has two opposite lateral webs 320, which extend from the fixing portion 33, starting opposite to the insertion direction R4 and respectively form a lateral edge of the latching window 30 formed in the holding portion 32. The latching window 30 has a holding contour K30, which is corresponding transversely to the insertion direction R4 and with its edge spaced from the fixing portion 33, formed with a holding and guiding contour K4 of a latching lug 40 of a connector module 4.

Subsequent to the holding portion 32, the guiding portion 31 extends opposite to the insertion direction R4. An insertion recess 301 is formed on the free-standing end 310 of the guiding portion 31. This insertion recess 301 has a guiding contour K31, which is formed transversely to the insertion direction R4 corresponding to the projecting holding and guiding contour K4 of the connector module 4. The guiding portion 31 is exposed to the holding portion 32 by a predetermined amount to the outside. Due to the shape of its guiding portion 31, the latch and spring element 3 has a particularly advantageous dielectric strength against air and/or creepage distances with respect to electrical contacts of the connector module 4.

When inserting a connector module 4 in a holding frame 1 provided with latch and spring elements 3, during spreading of the holding and guiding portion 3231, in particular the, compared to the guiding portion 31, narrow webs 320 of the holding portion 32 are bent outwards reversibly. The latch and spring element 3 with its webs 320 and in particular with the dimensions of its latching window 30 is particularly suitable for a base frame 200, which has suitably designed and arranged bases 22 for supporting latching lugs 40 of a connector module 4 latched with the latching window 30.

Figure 2C:
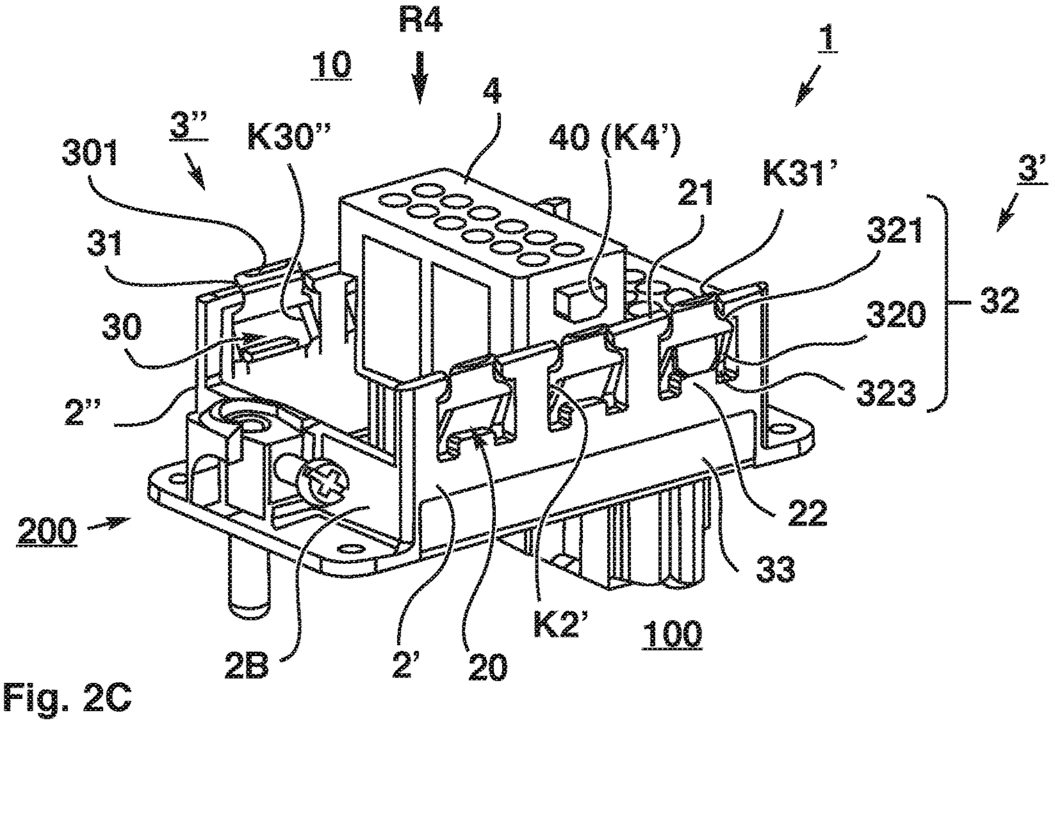
FIG. 2C shows a perspective view of a holding frame according to another embodiment with a partially and a final inserted connector module.

FIG. 2C shows a perspective view of a holding frame 1 according to a further improved embodiment with a partially and a fully inserted connector module 4. The latch and spring elements 3' and 3" have, as well as the latch and spring element 3 described above, a fixing portion 33 and three spaced latch and spring elements 3' and 3" on.

The holding frame 1 of this embodiment has a base frame 200 with a first side wall 2' and a parallel opposite second side wall 2". At a right angle thereto, the base frame 200 has two transverse walls 2B, of which only one can be seen in the drawing, because the other is covered by the holding frame 1 itself. The transverse walls 2B are in this embodiment formed, respectively, by means of bends on the ends of the composite side walls 2' and 2". The transverse walls 2B connect the two side walls 2' and 2" ends to each other and further each have a screwing flange with two screwing holes.

In cross section, the base frame 200 thus has a rectangular shape formed by the two side walls 2' and 2" and the two transverse walls 2B, in other words a rectangular cross section. Its cross-section extending perpendicular to the two transverse walls 2B and side walls 2' and 2" defines a plane which extends transversely to the insertion direction R4 of the connector modules 4.

The two side walls 2' and 2" have L- and T-shaped posts 21 extending opposite to the insertion direction R4. The L-shaped posts 21 are arranged at the ends of the side walls 2' and 2" of the holding frame 1, the T-shaped posts 21 are located therebetween. The posts 21 each have a base region oriented vertically in the drawing and, at their free ends, a transverse bar extending perpendicular thereto, through which they receive the T or L shape. The base regions of the adjacent posts of each side wall 2' and 2" are each arranged at a predetermined distance from one another, the base regions of two adjacent posts 21 of a side wall 2' and 2" each defining a latching region 20.

The latching region 20 is provided for accommodating a holding and guiding portion 3231 of a respective latch and spring element 3' and 3" and designed to correspond to the holding and guiding portion 3231, the holding and guiding portion 3231 each having a side contour K32' and K32", which corresponds respectively with a side contour K2' and K2" of the latching region 20. The holding and guiding portions 3231 in this case each have a holding portion 32, a guiding portion 31 and a latching means designed as latching window 30.

The latch and spring elements 3' and 3" of the holding frame 1 shown here in the drawing, designed to accommodate three connector modules 4, substantially correspond to the above-described latch and spring element 3, with their fixing portion 33, and their holding and guiding portions 3231. The corresponding base frame 200 thus has, at its two side walls 2' and 2" respectively, exactly two L-shaped and exactly two T-shaped posts 21, so that, respectively, three latching regions 30 for the three holding and guiding portions 3231 the latch and spring elements 3' and 3" are provided. Of course, for this and any other described form of the holding frame 1, any other natural number n, which is greater than 1, at slots and thus any other number of T-shaped post 21 are conceivable. If, for example, in an extreme case, the number of slots is n=2 in the holding frame 1, then this would result in each side wall 2' and 2", between its two end L-shaped posts, has a number of n−1, i.e. a single T-shaped post 21.

The side walls 2' and 2" differ in particular in the concrete dimensions of their respective side contour K2' and K2" in particular transversely to the insertion direction R4 and are also substantially the same design, which is why hereinafter a representative side wall 2' is described. This also applies to the latch and spring element 3' fixed to the side wall 2'.

The webs 320 of the holding portion 32 have, at the region adjacent to the fixing portion 33, a first curvature and/or bending by a predetermined amount to the outside, so that the holding portion 32 of the latch and spring element 3' fixed on the side wall 2' within a latching region 20 is arranged. In this case, the two webs 320 of the holding portion 32 are each arranged adjacent to a latching region 20 delimiting post 21 and a base 22 which is provided between the post 21 in the latching region 20. The base 22 has, on both sides to the base regions of its adjacent posts 21, a distance which corresponds to or exceeds the width of the webs 320 of the locking window 30. This ensures that, at least in the insertion and removal process, in particular the holding portions 32 of the latch and spring element 3' can move freely through the latching region 20 between the adjacent posts 21.

The holding portion 32 of the latch and spring element 3' is adjacent to its guiding portion 31, which adjoins opposite to the insertion direction R4, additionally formed in a tapered manner such that on the holding portion 32 two shoulders 321 are formed. The shoulders 321 are also arranged within the latching region 20, which is fixed on the side wall 2', and also adjacent to a crossbar of a post 21.

The projecting crossbars of the posts 21 thereby form a stop for the shoulders 321 of the latch and spring element 3', in particular in the event of insertion and tension forces acting against the insertion direction R4 on a plug connector module 4 introduced into the holding frame 1, which is held by force on its cable connection side edge with its latching nose 40 by a locking window 30 transverse to the insertion direction R4, e.g. for absorbing insertion forces. The latching lug 40 of the connector module 4 also lies on the latching region 20 in the socket-side arranged base 22.

Thus, the connector module 4 is held by the locking window 30 of the latch and spring element 3' with its latching lug 40 in the direction R3 opposite to the insertion direction R4 and perpendicular thereto along the side wall 2', wherein the latch and spring element 3' is in turn supported by the post 21 of the base frame 200. More precisely, the latching lug 40 is held in the direction R3 opposite to the insertion direction R4 by the cable connection-side edge of the latching window 30 and perpendicular thereto by its webs 320. In this case, the webs 320 are supported by the base region and the shoulders 321 by the transverse bars of the posts 21. The latch and spring element 3' therefore supports itself, in other words, for stabilizing the connector module 4 in the holding frame, with the post 21 of the base frame 200, namely by means of its shoulders 321 and webs 320.

In these aforementioned directions, the latching lug 40 is held by the latch and spring element 3' directly and at least indirectly by the base frame. In the insertion direction R4, however, the latching lug 40 is held force fittingly by the base 22 of the base frame 200, i.e. directly by the base frame 200. Although perpendicular to the side wall 2', the connector module 4 is substantially held by the base frame 200, wherein, however, the inner leg of the fixing portion 33 of the latch and spring element 3' is arranged between the connector module 4 and the base frame 200.

The holding portion 32 of the latch and spring element 3' has a second curvature and/or bending B2 adjacent to the edge of its latching window 30 in its further extension opposite to the insertion direction R4, which is inwardly bent and/or angled against its projecting first curvature and/or bending B1 such that the holding portion 32 extends between the crossbar of the posts 21 against the insertion direction R4 out of the latching region 20 exceeding the crossbars.

Following this, the guiding portion 31 adjoining the holding portion 32 of the holding and guiding portion 3231 of the latch and spring element 3' has a third curvature and/or bending B3 in which the guiding portion 31 with its free-standing end 310 having an insertion recess 301 which is bent and/or angled outwards.

The holding portion 32 of the holding and guiding portion 3231 can also advantageously have a stamping 322 formed in the region of its latching window 30, in particular on its webs 320, by means of which a bending point 323 for bending the holding and guiding portion 3231 is placed as close as possible to the plug-in opening 100 of the holding frame 1. In this way, as described above, a space required for a proper bending and/or spreading of the holding and guiding portion 3231 can be minimized.

As stated above, the holding frame 1 has a base frame 200 with a first 2' and a second 2" side wall, which differ in particular in the dimensions transverse to the insertion direction R4 of their locking sections 20, their posts 21 and their bases 22, which are provided in the latching regions 20. The latching regions 20 of the first 2' and second 2" side wall each have a first K2' and second K2" side contour.

The holding frame 1 in this case has a first 3' and second 3" latch and spring element with first and second holding and guiding portions 3231, corresponding to the first and second latching regions 20 and the posts 21 of the first 2' and second 2" sidewall which differ in dimension transverse to the insertion direction R4. The first and second holding and guiding portions 3231 each have a first K32' and a second K32" side contour, which is formed correspondingly to the first K2' and second K2" side contour of the first 2' and second 2" side wall in such a manner that the holding and guiding portions 3231 are reversibly bendable into the latching regions 20.

In this case, the first and second holding and guiding portions 3231 are in particular designed such that they each have a latching means formed as a latching window 30 and an insertion recess 301, which, respectively, corresponds to the edge of the latching window 30 with a first K4' and second K4" holding and guiding contour of a latching lug 40 of a connector module 4, in particular transversely to the insertion direction R4, the edge is spaced from the base 22, and respectively has a corresponding first K30' and second K30" holding contour and a first K31' and second K31" guiding contour.

The holding frame 1 with the above-described embodiment of its base frame 200 with the first side wall 2' with the side contour K2', with the latch and spring element 3', with the side contour K32', with the retaining contour K30' and the guiding contour K31" and with the second side wall 2" with the side contour K2", with the latch and spring element 3" and the side contour K32", the retaining contour K30" and the guiding contour K31" is particularly suitable for the orientation-fixed predetermined arrangement of a connector module 4, which has a first latching nose 40 provided with a first holding and guiding contour K4' and a second latching nose 40 provided with a second holding and guiding contour K4".

The protruding first K30' and second K30" holding contours and the first K31' and second K31" guiding contours of the first 3' and second 3" latch and spring element are, as described above, each formed and arranged especially transversely to the insertion direction R4 corresponding to the first K4' and second K4" holding and guiding contour of a connector module 4. With the free-standing ends 310 of its latch and spring elements 3' and 3", the holding frame 1 has a likewise described advantageous electrical voltage resistance.

FIGS. 3A to 7B show an embodiment which is modified and thereby further improved in some respects as described below with respect to the aforementioned embodiment.

Figure 3A:
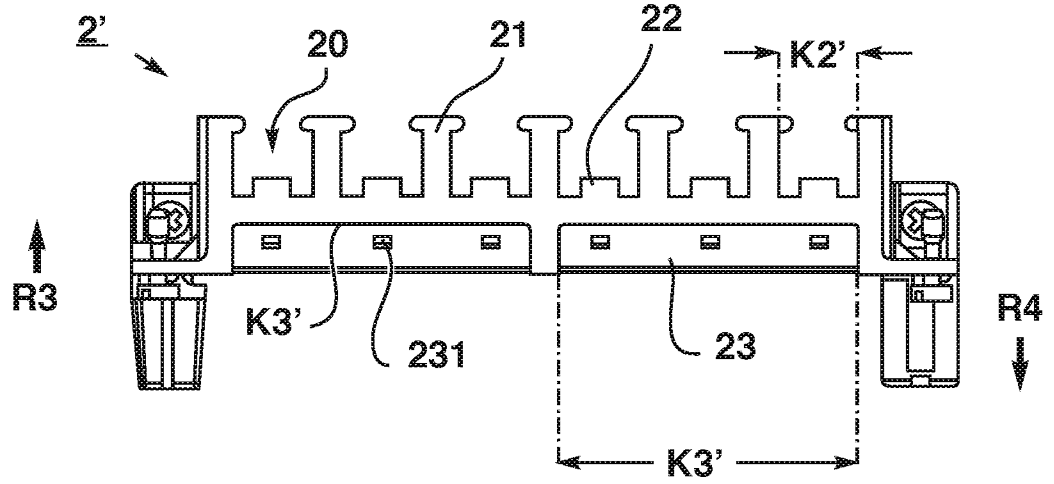
FIG. 3A shows a first side wall of a base frame suitable for a holding frame according to a further embodiment.

FIG. 3A shows a first side wall 2' of a base frame 200 suitable for a holding frame 1.

The side wall 2' has, opposite the insertion direction R4 of a connector module 4, extending T and/or L-shaped posts 21, wherein two adjacent posts 21 define a latching region 20. On the outside wall of the side wall 2' two spaced-apart lowered terraces 23 are formed transversely to the insertion direction R4, each having three pins 231, wherein the lowered terraces 23 extend below the latching region 20 in the insertion direction R4 to a lower edge of the side wall 2' and which comprise a first fixing contour K3'.

The side wall 2' has, in this example, at the end two L-shaped and five T-shaped posts 21, i.e. a total of seven posts 21. Thus, with its six locking sections 20 it is designed for a holding frame 1 for the accommodation of six connector modules 4. With its two lowered terraces 23, it is also designed for assembly with two first latch and spring elements 3', which will be described below.

On the inside of the side wall 2' opposite to said, externally arranged lowered terrace 23, a further, inner lowered terrace may be provided, which is respectively formed by the edge on the inside of the base 22 transverse to the insertion direction R4 and also by the edge defining post 21 on the inside of the fixing contour K3 formed parallel to the insertion direction R4.

Figure 3B:
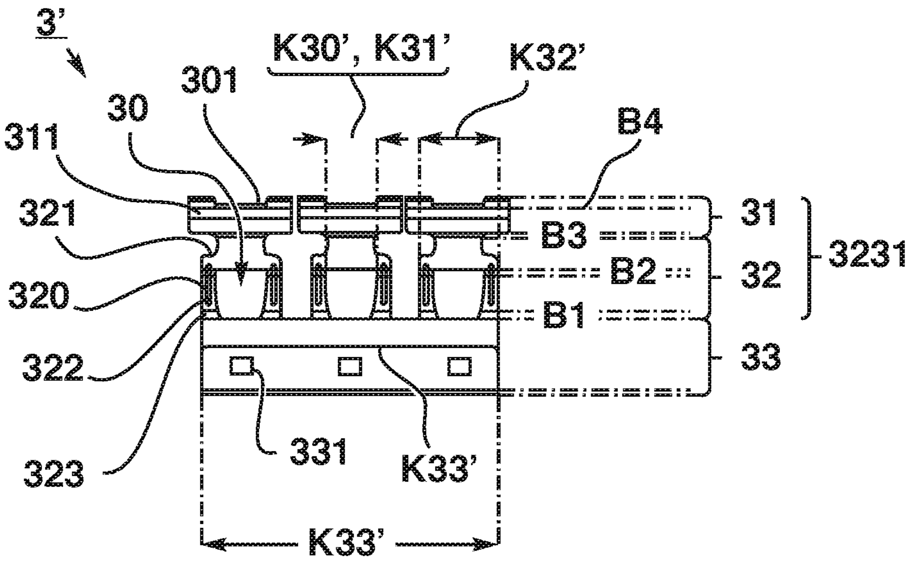
FIG. 3B shows a first latch and spring element suitable for the first side wall of FIG. 3A.
Figure 3C:
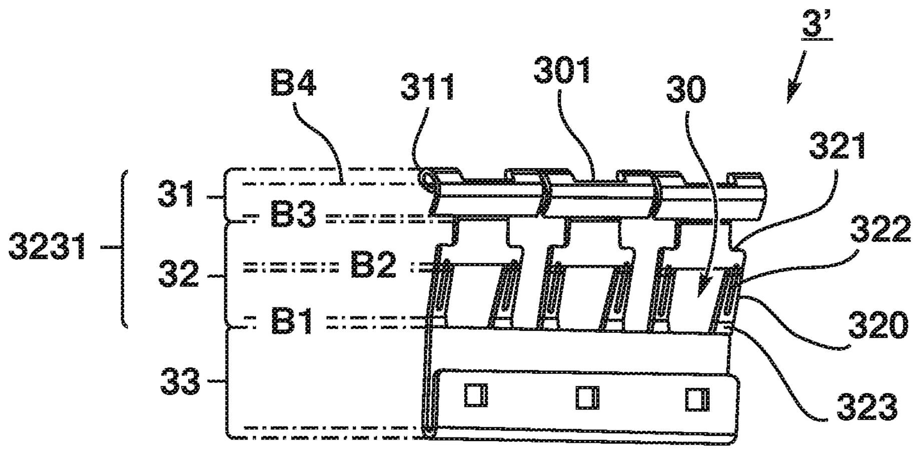
FIG. 3C shows a perspective view of the first latch and spring element of FIG. 3B.

FIG. 3B shows a first latch and spring element 3' suitable for the above-described first side wall 2', and FIG. 3C shows a perspective illustration of this first latch and spring element 3'.

The latch and spring element 3' has a narrow U-shaped fixing portion 33. An outer leg of the U-shaped fixing portion 33 has a first fixing contour K33'. At an inner leg of the fixing portion 33 extending parallel to the outer leg and beyond the outer leg, three holding and guiding portions 3231, which are arranged next to one another at a predetermined spacing and are designed as tabs 3231, extend. The outer leg of the U-shaped fixing portion 33 also has three mounting recesses 331. For reasons of clarity, the inner and outer legs of the fixing portion 33 are not provided with reference numerals.

The outer and the inner mutually parallel extending leg of the U-shaped fixing portion 33 are spaced and formed such that the latch and spring element 3' in the direction R3 opposite to the insertion direction R4 can be assembled with the side wall 2' in such a manner, that the latch and spring element 3' is fixed to the side wall 2'. For this purpose, the fixing contour K33' of the outer leg is arranged and formed corresponding to the fixing contour K3' of the lowered terrace 23 of the side wall 2'. In addition, for this purpose, the attachment recesses 331 of the outer leg are arranged and designed corresponding to the pins 231 of the lowered terrace 23, In this case, the U-shaped fixing portion 33 surrounds the lower edge of the side wall 2' with its outer and inner legs such that the outer leg is arranged on the outside form fittingly in the lowered terrace 23. The pins 231 engage with the mounting recesses 331, so that the latch and spring element 3' is finally fixed to the side wall 2'. The inner leg of the U-shaped fixing portion 33 extends adjacent to the inside of the side wall 2' and parallel to the side wall 2' and the outer leg, in the direction R3 opposite to the insertion direction R4 up to the latching region 20.

The inner leg is arranged in such a form-fitting manner in the lowered terrace formed on the inside of the side wall 2' that its inside with the inside of the base 22 and the post 21 forms a flat inside surface. An edge formed on the inside of the base 22 transversely to the insertion direction R4 advantageously forms a stop for the latch and spring element 3' when plug and/or pulling forces act against the insertion direction R4 onto the connector module 4 and the latch and spring element 3' inserted into the holding frame 1.

As stated above, the three holding and guiding portions 3231 extending from the fixing portion 33 opposite to the insertion direction R4 have the same configuration, so that one holding and guiding portion 3231 will be described here by way of example, respectively.

The holding and guiding portion 3231 of the latch and spring element 3' has a holding portion 32 with two webs 320 spaced apart at a predetermined distance which extend from the inner leg of the U-shaped fixing portion 33 opposite to the insertion direction R4 and limit a locking means transverse to the insertion direction R4, the locking means is formed as a latching window 30 provided in the holding portion 32.

The holding portion 32 of the holding and guiding portion 3231 is tapered in its further course opposite to the insertion direction R4 and respectively has a shoulder 321 provided opposite to the insertion direction R4 via the webs 320 and the latching window 30. The holding portion 32 has a first side contour K32'. This side contour K32' is formed and arranged in such a manner corresponding to the side contour K2' of the latching region 20 of the side wall 2' that the holding portion 32 with its webs 320, its shoulders 321 and its latching window 30 is reversibly bendable in the latching region 20.

The latching window 30 of the holding portion 32 has a first holding contour K30'. The holding contour K30' is formed and arranged corresponding to a first holding and guiding contour K4' of a first latching lug 40 of a connector module 4 such, that the holding and guiding contour K4' of the connector module 4 inserted into the holding frame 1 with the holding contour K30' and locked while the connector module 4 is held in the holding frame 1.

The holding portion 32 is bent and/or angled in a region of its webs 320 adjacent to the fixing portion 33 by a first predetermined amount in the direction of the outer limb of the fixing portion 33. Thus, a first curvature and/or bending B1 of the holding and guiding portion 3231 is provided. The holding portion 32 is further bent and/or angled in a region spaced from the fixing portion 33 in the opposite direction to the above first curvature and/or bending B1. As a result, a second curvature and/or bending B2 of the holding and guiding portion 3231 is provided.

The guiding portion 31 subsequent to the holding portion 32 is bent and/or angled, relative to the holding portion 32, in its region adjacent to the holding portion 32 in the direction towards the outer leg of the fixing portion 33. Thereby, a third curvature and/or bending B3 of the holding and guiding portion 3231 is provided. In its further course, the guiding portion 31 is bent and/or angled opposite to the insertion direction R4 in the opposite direction to the third curvature and/or bending B3. As a result, a fourth curvature and/or bending B4 of the holding and guiding portion 3231 is provided. The above-described first B1, second B2, third B3 and fourth B4 curvature and/or bending of the holding and guiding portion 3231 are respectively shown on the latch and spring element 3' as a solid line, which is laterally continued as a dash-dotted line.

Following the fourth curvature and/or bending B4 of the holding and guiding portion 3231, the inwardly inclined end 310 of the guiding portion 31, which is free in the opposite direction to the insertion direction R4, is formed in a U-shaped bend 311 such that the free-standing end 310 is arranged adjacent to the side of the guiding portion 31 corresponding to the inner leg of the fixing portion 33. The guiding portion 31 has a centrally formed and arranged insertion recess 301 on the bend 311. The insertion recess 301 in this case has a first guiding contour K31' which corresponds to the holding and guiding contour K4' of the latching lug 40 of the connector module 4 transversely to the insertion direction R4 such that an insertion of the connector module 4 in the holding frame 1 is made possible.

In its region adjoining the latching window 30 opposite to the insertion direction R4, the holding portion 32 has a tapered region, which is designed such that two shoulders 321 of the holding portion 32 arranged adjacent to the ends of the webs 320 are provided.

The webs 320 have an advantageous elongated embossment 322 which is designed and arranged such that a bending point 323 of the webs 320 is arranged adjacent to the fixing portion 33 and adjacent to the upper edge of the side wall 2'.

With the embossment 322 and the bending point 323, the holding and guiding portion 3231 is formed such that, in a direction of insertion R4 and/or in the direction of the outer leg of the fixing portion 33 on the holding and/or guiding portion 3231 and in particular on the guiding portion 31 and the insertion recess 301, the acting force of the holding and guiding portion 3231 of a latch and spring element 3' fixed on the side wall 2' is reversibly bent and/or spread in the outward direction by means of a bend at the bending point 323.

Figure 4A:
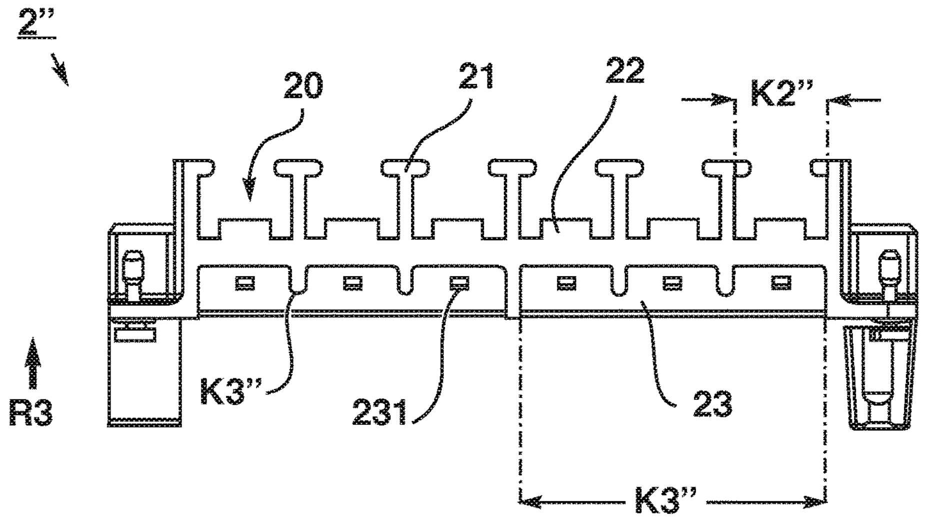
FIG. 4A shows a second side wall of the frame suitable for the holding frame according to this embodiment.

FIG. 4A shows a second side wall 2", which is designed such that, together with the first side wall 2' described above, it provides the base frame 200 of the holding frame 1, which is also described above.

The side wall 2" has, like the side wall 2', T and L-shaped posts 21 extending opposite to the insertion direction R4 of a connector module 4. Respectively, two adjacent posts 21 transverse to the insertion direction R4 each define a latching region 20. This latching region 20 has a second side contour K2" and said base 22. On the outside wall of the side wall 2" are, transversely to the insertion direction R4, two spaced apart lowered terraces 23 are formed. These lowered terraces 23 extend below the latching region 20 in the insertion direction R4 to a lower edge of the side wall 2". In each of these lowered terraces 23 three pins 231 are arranged respectively. Furthermore, they have a second fixing contour K3".

The side wall 2" in the illustrated embodiment, by way of example, with its six latching regions 20 is designed just as the side wall 2' for the holding frame 1 for the accommodation of six connector modules 4. With its two lowered terraces 23, it is designed to be assembled with two latch and spring elements 3" designed for latching with three connector modules 4 each. Of course also another number of latching regions 20 and/or latch and spring elements 3" may be provided.

As already mentioned in connection with the aforementioned embodiment, of course, in this embodiment any other natural number n>1 of receivable connector modules 4 and thus also of latching regions 20 is conceivable.

As in the case of the above-described side wall 2', a further step can also be provided on the inside of the side wall 2" with respect to the lowered terrace 23. This is respectively formed by edges formed on the inner side of the base 22 transversely to the insertion direction R4 and also by edges formed on the inner side of the posts 21 delimiting the fixing contour K3" parallel to the insertion direction R4.

The first side wall 2' and the second side wall 2" differ in this respect by the dimensions of the side contours K2' and K2" of their latching regions 20 and by the fixing contours K3' and K3" their lowered terraces 23.

Figure 4B:
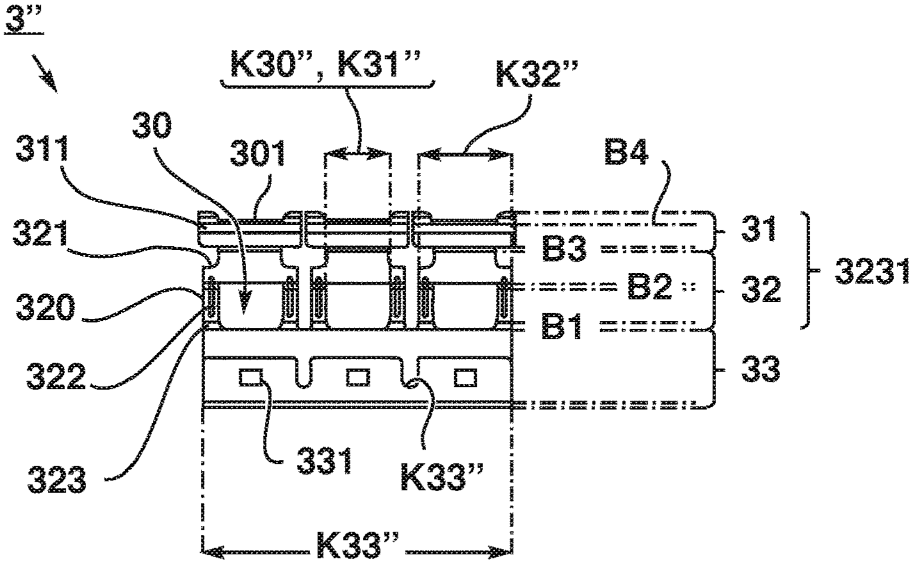
FIG. 4B shows a second latch and spring element suitable for the second side wall of FIG. 4A.
Figure 4C:
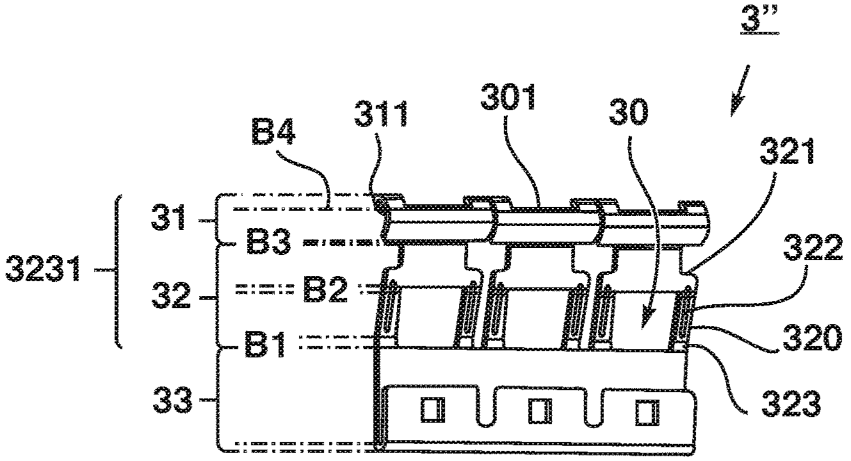
FIG. 4C shows a perspective view of the second latch and spring element of FIG. 4B.

FIG. 4B shows a second latch and spring element 3" suitable for the above-described side wall 2", and FIG. 4C shows a perspective illustration of this latch and spring element 3".

The latch and spring element 3" substantially corresponds to the above-described first latch and spring element 3', for which reason reference is made to the corresponding description. The latch and spring element 3" in this case has a fixing portion 33 with three holding and guiding portions 3231 and designed as a latching means formed as a latching window 30, which are each analogous to the first latch and spring element 3'.

The second latch and spring element 3" differs from the latch and spring element 3' in that the holding and guiding portion 3231 of the latch and spring element 3" has a second side contour K32" that corresponds to the side contour K2" of the latching region 20 of the second side wall 2".

Unlike the latch and spring element 3', the latch and spring element 3" also has a second fixing contour K33" of its fixing portion 33, which is formed form fittingly with the fixing contour K3" of the lowered terrace 23 of the side wall 2".

The latch and spring element 3", in contrast to the latch and spring element 3', furthermore has a second holding contour K30" of its latching window 30 and a second guiding contour K31" of its insertion cutout 301, which correspond to a second holding and guiding contour K4" of a second latching lug 40 of the connector module 4.

Such a holding frame 1 is thus particularly well suited for the early polarization of the connector module 4. Finally, the correct orientation of the connector module 4 is already detected at the first contact of its latching lugs 40 with the latch and spring elements 3' and 3" and is a prerequisite for the further insertion process.

Figure 5A:
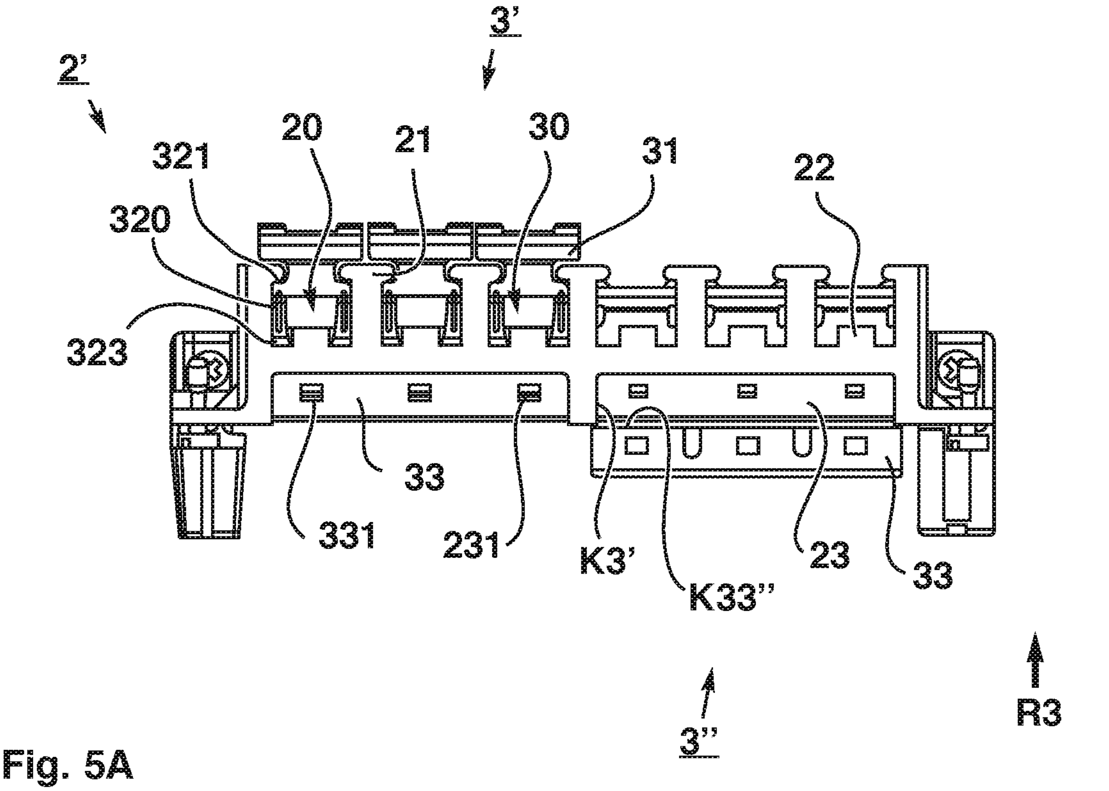
FIG. 5A shows the first side wall of FIG. 3A with the first and second latch and spring elements of FIG. 3B and FIG. 4B.
Figure 5B:
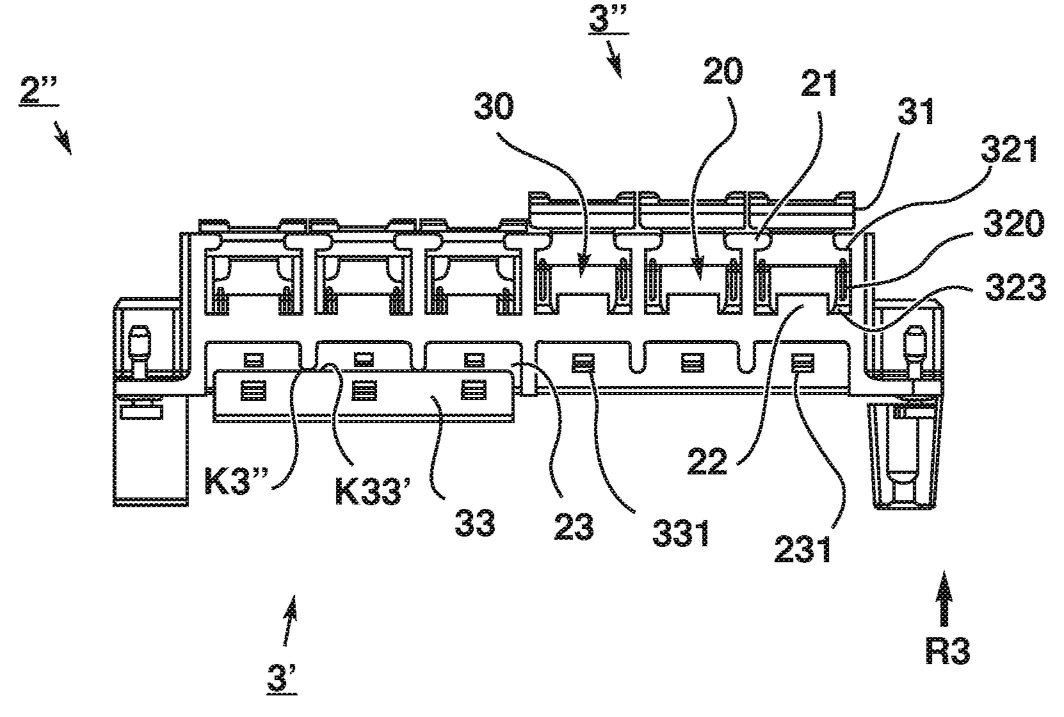
FIG. 5B shows the second side wall of FIG. 4A with the first and second latch and spring elements of FIGS. 3B and 4B.

FIG. 5A shows the first side wall 2' with the first and second latch and spring elements 3' and 3", and FIG. 5B shows the second side wall 2" with the first and second latch and spring elements 3' and 3".

In FIG. 5A, the latch and spring element 3' is assembled with the side wall 2' in the direction R3 opposite to the insertion direction R4. The U-shaped fixing portion 33 of the latch and spring element 3' engages around the lower edge of the side wall 2' in the drawing, so that the outer leg of the U-shaped fixing portion 33 lies form fittingly in the associated lowered terrace 23, which in this illustration by the outer leg of the fixing portion 33 is hidden and thus cannot be seen here. The fixing contours K3' and K33' engage each other in such a form-fitting manner that the pins 231 of the side wall 2' are latched to the fixing recesses 331 of the fixing portion 33. The latch and spring element 3' is thereby fixed to the side wall 2'. In this case, the inner leg of the fixing portion 33 is form-fittingly arranged in the inner lowered terrace of the side wall 2' so that the inside of the latch and spring element 3' forms a flat surface with the inside of the base 22 and the post 21.

In addition, the holding portion 32 of the latch and spring element 3' with its webs 320 and its latching window 30 is arranged bendable and/or spreadable into the latching region 20 of the side wall 2'. The guiding portion 31 protrudes simultaneously with its insertion recess 301 against the insertion direction R4 exceeding the posts 21 of the side wall 2'. In this case, the guiding portion 31 extends parallel to the side wall 2' such that adjacent guiding portions 31 have a predetermined small distance smaller than the holding and guiding contour K4' of the connector module 4.

The side contour K32' of the holding portion 32 corresponds in this case to the side contour K2' of the latching region 20 such that the latching window 30 is arranged in the latching region 20, the webs 320 are arranged adjacent to the posts 21 and the shoulders 321 are adjacent to the transverse bars of the posts 21. The bending points 323 are advantageously arranged in particular adjacent to the upper edge of the side wall 2'.

Furthermore, it becomes clear how a faulty assembly is effectively avoided. The second latch and spring element 3" cannot be assembled with the first side wall 2' because the fixing contour K33" of the latch and spring element 3" and the fixing contour K3' of the lowered terrace 23 of the side wall 2' do not fit together in a form-fitting manner. In this way, it is ensured that the first side wall 2' having the lowered terrace 23 with the fixing contour K3' can only be assembled as intended with a matching first latch and spring element 3' having the fixing contour K33'.

In FIG. 5B, the second latch and spring element 3" in the direction R3 opposite to the insertion direction R4 is assembled with the second side wall 2", wherein the U-shaped fixing portion 33 of the latch and spring element 3" engages the lower edge of the side wall 2" in the drawing in such a way that the outer leg of the second U-shaped fixing portion 33 is form fittingly received in the second lowered terrace 23. The fixing contours K3" and K33" engage in one another such that the pins 231 of the second side wall 2" are positively locked with the fastening recesses 331 of the fixing portion 33. The latch and spring element 3" is thereby fixed to the side wall 2". The inner leg of the fixing portion 33 can also be arranged in such a form-fitting manner in the inner lowered terrace of the side wall 2' that the inside of the latch and spring element 3" with the inside of the base 22 and the post 21 forms a flat surface.

In addition, the holding portion 32 of the latch and spring element 3" with its webs 320 and its latching window 30 is bendable and/or spreadable arranged in the latching region 20 of the side wall 2". At the same time, the guiding portion 31 projects with its insertion recess 301 against the insertion direction R4 beyond the posts 21 of the side wall 2". Thereby, the guiding portion 31 extends in parallel to the side wall 2" such that adjacent guiding portions 31 have a small distance which is smaller than the holding and guiding contour K4' of the connector module 4.

The side contour K32" of the holding portion 32 corresponds in this case to the side contour K2" of the latching region 20 such that the latching window 30 is arranged in the latching region 20. Then, the webs 320 are arranged adjacent to a post 21 and the shoulders 321 adjacent to a crossbar of the posts 21. The bending points 323 are advantageously arranged in particular adjacent to the upper edge of the side wall 2".

Furthermore, it becomes clear how a faulty assembly is effectively avoided. Namely, the first latch and spring element 3' cannot be assembled with the second side wall 2", since the fixing contour K33' of the latch and spring element 3' and the fixing contour K3" of the lowered terrace 23 of the side wall 2" do not fit together in a form-fitting manner. In this way, it is ensured that the second side wall 2" having the lowered terrace 23 with the fixing contour K3" can only be properly assembled with a matching second latch and spring element 3" having the fixing contour K33".

After the above first latch and spring element 3' has the latching window 30 with the first holding contour K30' and the second latch and spring element 3" has the latching window 30 with the second holding contour K30" it is also ensured that the intendedly first 2' and second 2" side wall, as described above, assembled with the first 3' and second 3" latch and spring elements respectively, only comprises latching windows 30 with each first K30' and second K30" holding contours and with each first K31' and second K31" guiding contours. A holding frame 1 comprising the first 2' and second 2" side wall thus provides a predetermined unambiguous orientation and/or polarization for insertion and accommodation of connector modules 4 having a first K4' and second K4" holding and guiding contour.

Figure 6A:
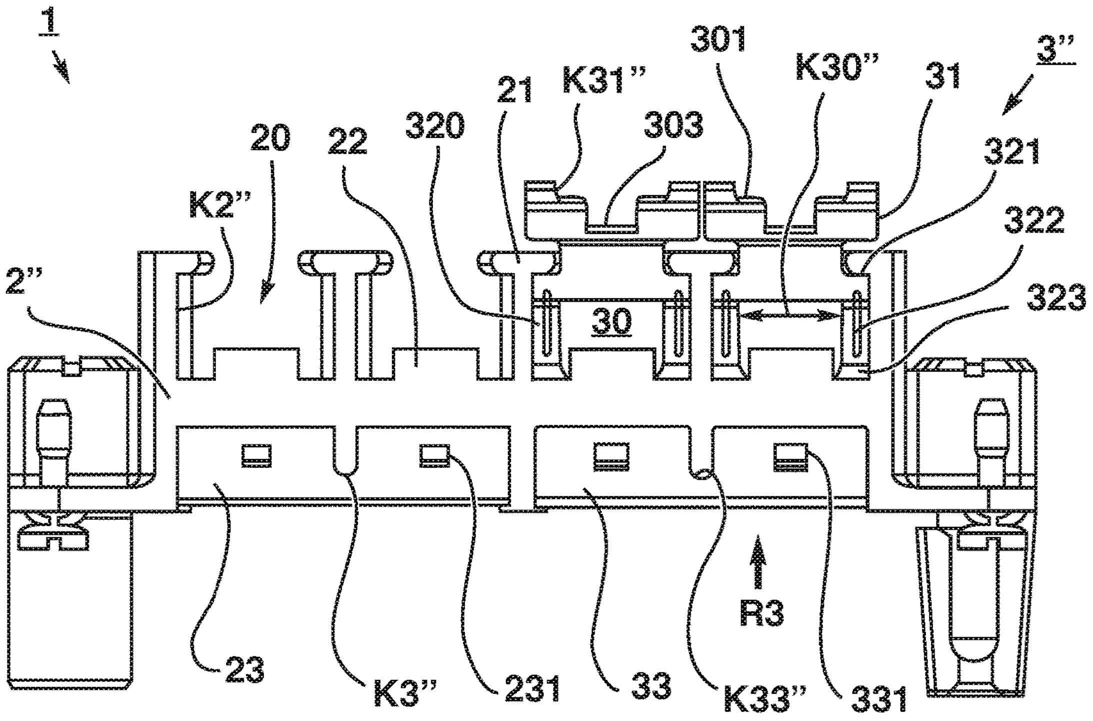
FIG. 6A shows a holding frame provided with a latch and spring element according to this embodiment.

FIG. 6A shows a holding frame 1 provided with a latch and spring element 3" according to an embodiment, wherein the second side wall 2" is shown in front of the first side wall 2' and conceals the side wall 2'.

The holding frame 1 with the base frame 200 and the side walls 2' and 2" of this embodiment is designed to be fitted with two first 3' and second 3" latch and spring elements and four connector modules 4.

Figure 6B:
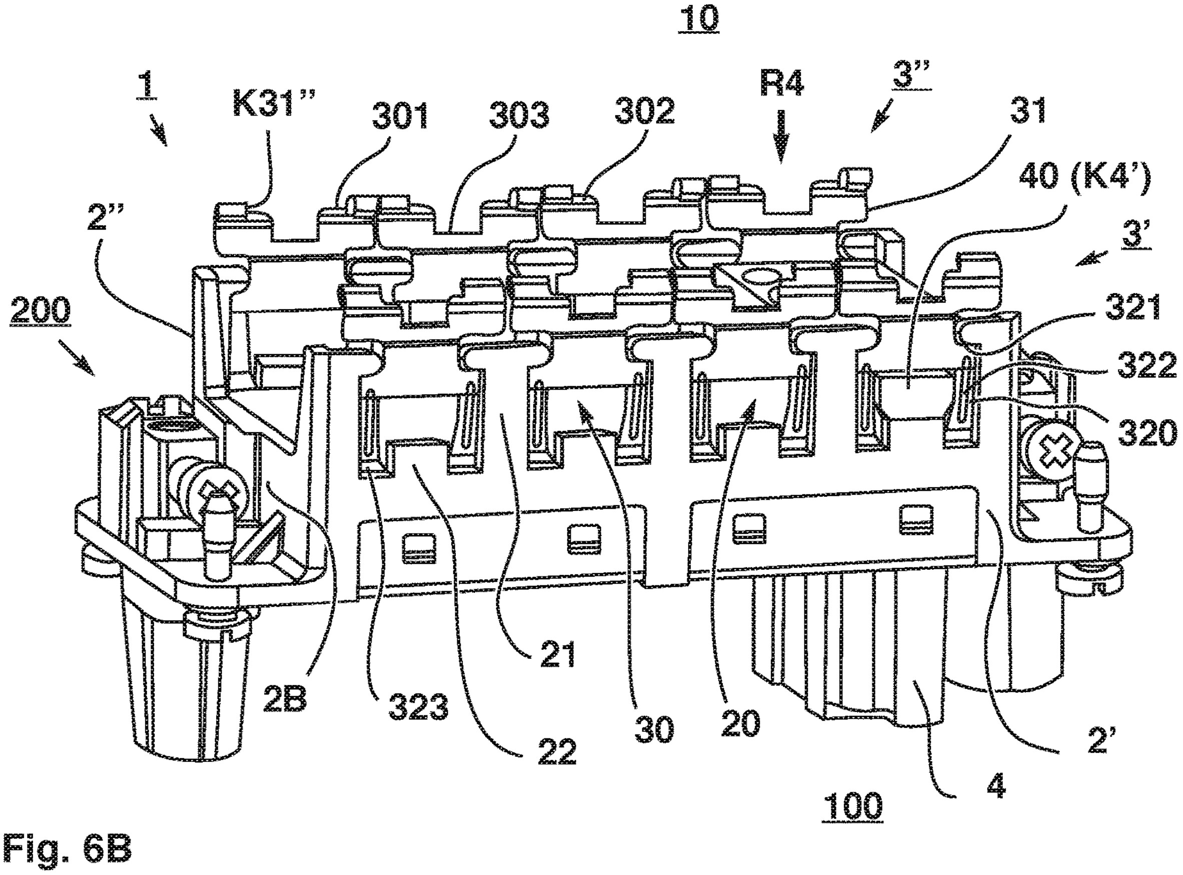
FIG. 6B shows a perspective view of the holding frame of FIG. 6A, which is fully equipped with latch and spring elements and with a connector module.

FIG. 6B shows a perspective view of the holding frame 1, which is fully equipped with latch and spring elements 3' and 3" and also with a connector module 4, wherein the first side wall 2' in front of the second side wall 2" is shown.

The holding frame 1 is each equipped with two latch and spring elements 3' and 3" on each side wall 2' and 2". These differ from the latch and spring elements 3' and 3" described above essentially in that their insertion recesses 301 have a further recess 303 in the center. In addition, they are each designed to be fitted with two connector modules 4.

The central further recesses 303, as well as the insertion recesses 301, are formed corresponding to holding and guiding contours K4' and K4" of the latching lugs 40 of the connector modules 4. These latching noses 40 may in particular have plug-side lateral chamfers 41, so that the insertion recesses 301 with the further recesses 303 each provide an advantageous catching funnel for the slanted latching noses 40.

Otherwise, the latch and spring elements 3' assembled with the first side wall 2' and attached to it correspond to the first latch and spring elements 3' described above and the latch and spring elements 3" fastened to the second side wall 2" correspond to the second latch and spring elements 3" described above.

The latch and spring elements 3' and 3" are fixed with their fixing portions 33 as intended on the side walls 2' and 2". In this case, a holding and guiding portion 3231 of the latch and spring elements 3' and 3" extends respectively with its holding and guiding portion 3231 having a projecting first curvature and/or bending B1 from the inside to the outside and the latching window 30 by a predetermined amount in a latching region 20 of a side wall 2' and 2", so that the webs 320 are each arranged adjacent to a post 21.

In its further course opposite to the insertion direction R4, the holding portion 32 extends inwardly following its second curvature and/or bending B2 inwards substantially parallel to the posts 21. The shoulders 321 of the holding portion 32 are arranged adjacent to the transverse bars of the posts 21. The region of the holding and guiding portion 3231 adjoining the shoulders 321 extends between the posts 21 out of the latching region 20, opposite to the insertion direction R4.

At this area, the holding and guiding portion 3231 has the third curvature and/or bending B3 outwards and the fourth curvature and/or bending B4 inwards. Subsequent to the fourth curvature and/or bending B4, the U-shaped bend 311 is formed on the holding and guiding portion 3231.

The bend 311 and the insertion recess 301 are designed and arranged such that the insertion recess 301 is accessible in particular for a latching lug 40 of a connector module 4 having a retaining and guiding contour K4' and K4", in the insertion direction R4. Adjacent guiding portions 31 are formed and arranged such that they have a predetermined small distance smaller than the holding and guiding contour K4' and K4" of the connector module 4

In FIG. 6B, the connector module 4 is intentionally inserted through the cable connection side opening 10 in the holding frame 1 so that the latching lug 40 is latched to the latching window 30 of the first latch and spring element 3'. Of course, this also applies accordingly to the opposite latching lug 40 not shown in the drawing. In this case, the latching lug 40 rests with its lower edge, in the insertion direction R4, on the base 22 of the latching region 20, after so that the base 22 provides a stop for the connector module 4 in the insertion direction R4 on the side wall 2'.

The base 22 has on both sides to the base regions of its adjacent posts 21 a distance which corresponds to or exceeds the width of the webs 320 of the locking window 30. This ensures that, at least in the insertion and removal process, the latch and spring elements 3' and 3" with its holding portion 32 can move freely through the latching region 20 between the adjacent posts 21.

The cable connection-side edge of the latching lug 40 abuts against the cable connection-side edge of the latching window 30. As a result, the connector module 4 is held between the latch and spring element 3' and the base 22. When plugging and/or pulling forces act on the connector module 4 against the insertion direction R4, the crossbar of the posts 21 which are adjacent to the shoulders 321 of the holding portion 32, for the holding portion 32 of the latch and spring element 3' form a stop on the side wall 2'. In this way, the latch and spring elements 3' are supported on the side wall 2'. In this case, the above-described edge and/or lowered terrace of the base 22 forms a stop for the fixing contour of the latch and spring element 3'.

Transverse to the insertion direction R4, the connector module 4 of the locking window 30 with its two ridges 320 limiting the locking window 30 and the fixing contour K3' and lowered terraces formed the inside of posts 21 delimiting the latch and spring element 3' are each held form-fittingly and stationary in the holding frame 1.

The above description applies analogously to a second latch and spring element 3" fastened to the second side wall 2".

Figure 7A:
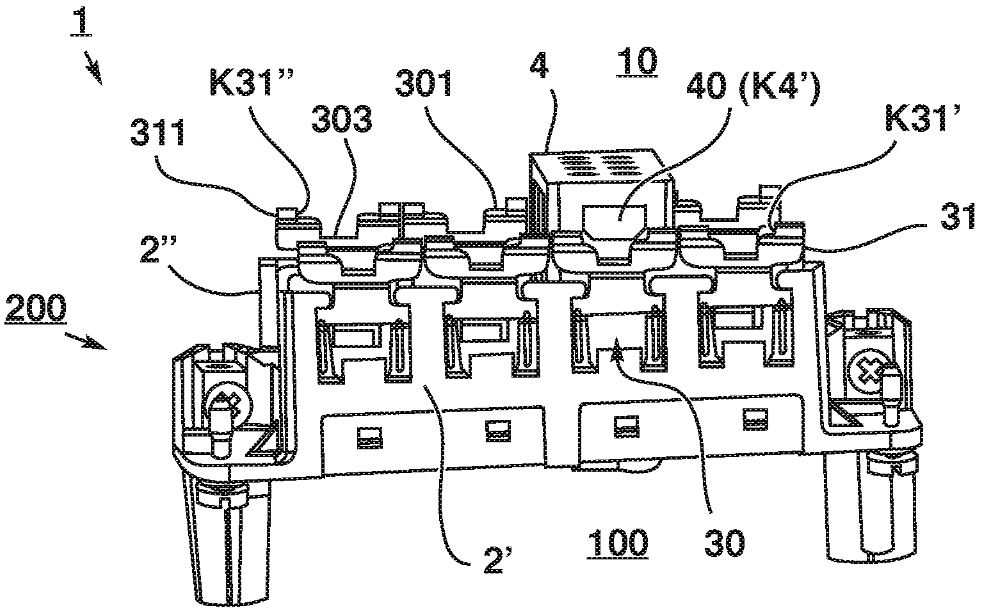
FIG. 7A shows a further perspective view of the holding frame equipped with latch and spring elements of FIG. 6B with a partially inserted connector module.

FIG. 7A shows a further perspective view of the holding frame 1, which is completely equipped with latch and spring elements 3' and 3", with a view of the first side wall 2'. In this holding frame 1, a connector module 4 is partially inserted in the correct orientation.

The connector module 4 is inserted in the holding frame 1 with its latching lug 40 in such a way that its holding and guiding contour K4' is arranged adjacent to the corresponding with its first guiding contour K31' of the insertion recess 301 of the guiding portion 31. In this case, the latching lug 40 may have said two chamfers 41. Then, the latching lug 40 is advantageously arranged in the catching funnel provided by means of the insertion recess 301 and its further recess 303.

In this correct orientation of the connector module 4 further insertion of the connector module 4 in the holding frame 1 is thus easily possible. In this case, the holding and guiding portion 3231 is initially spread open by the latching nose 40, which is initially introduced transversely to the insertion direction R4 into the insertion recess 301. This is followed by an intended latching of the latching window 30 having the first retaining contour K30' with the latching lug 40 by means of a corresponding relaxation of the holding and guiding portion 3231.

Thus, the connector module 4 is held with its latching lug 40 in the direction R3 opposite to the insertion direction R4 and perpendicular thereto along the side wall 2' by the locking window 30 of the latch and spring element 3', wherein the latch and spring element 3' in turn is supported by the post 21 of the base frame 200. More precisely, the latching lug 40 is held in the direction R3 opposite to the insertion direction R4 by the cable connection-side edge of the latching window 30 and perpendicular thereto by its webs 320.

In this case, the webs 320 are based on the base region and the shoulders 321 on the transverse bars of the posts 21. The latch and spring element 3' is therefore supported, in other words, in turn for stabilizing the connector module 4 in the holding frame to the post 21 of the base frame 200, namely by means of his shoulders 321 and webs 320. In these aforementioned directions, the latching lug 40 is directly held by the latch and spring element 3' and indirectly held by the base frame at least. In the insertion direction R4, however, the latching lug 40 is held by the base 22 of the base frame 200, i.e. force fittingly directly by the base frame 200. Although perpendicular to the side wall 2', the connector module 4 is held substantially by the base frame 200, wherein, however, the inner leg of the fixing portion 33 of the latch and spring element 3' is arranged between the connector module 4 and the base frame 200.

The above related to the first latch and spring element 3' applies analogously to the second latch and spring element 3".

Figure 7B:
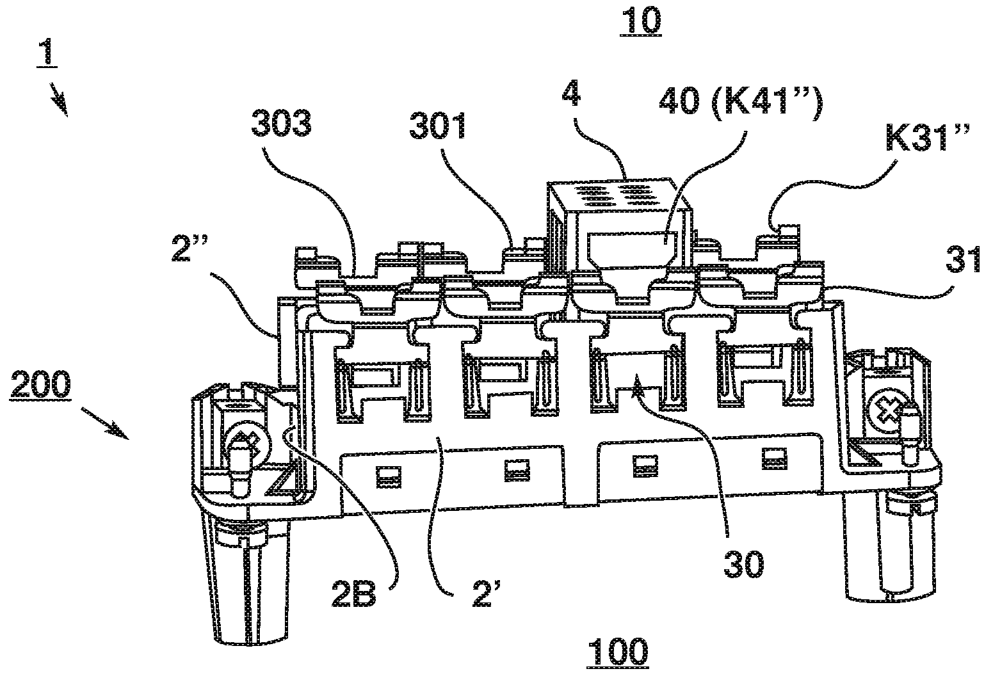
FIG. 7B shows another illustration of the holding frame of FIG. 7A with the partially inserted connector module in a different orientation

FIG. 7B shows a further perspective view of the holding frame 1, which is completely equipped with latch and spring elements 3' and 3", with a view of the first side wall 2'. Here, a connector module 4 is partially inserted in the holding frame in the wrong orientation.

It is readily apparent that the connector module in this wrong polarization is not insertable into the holding frame 1 for final locking.

FIGS. 8A to 11A show a particularly preferred embodiment, which, compared to the aforementioned embodiment, is once again favorably modified and thereby improved even further in some respects as described below.

Figure 8A:
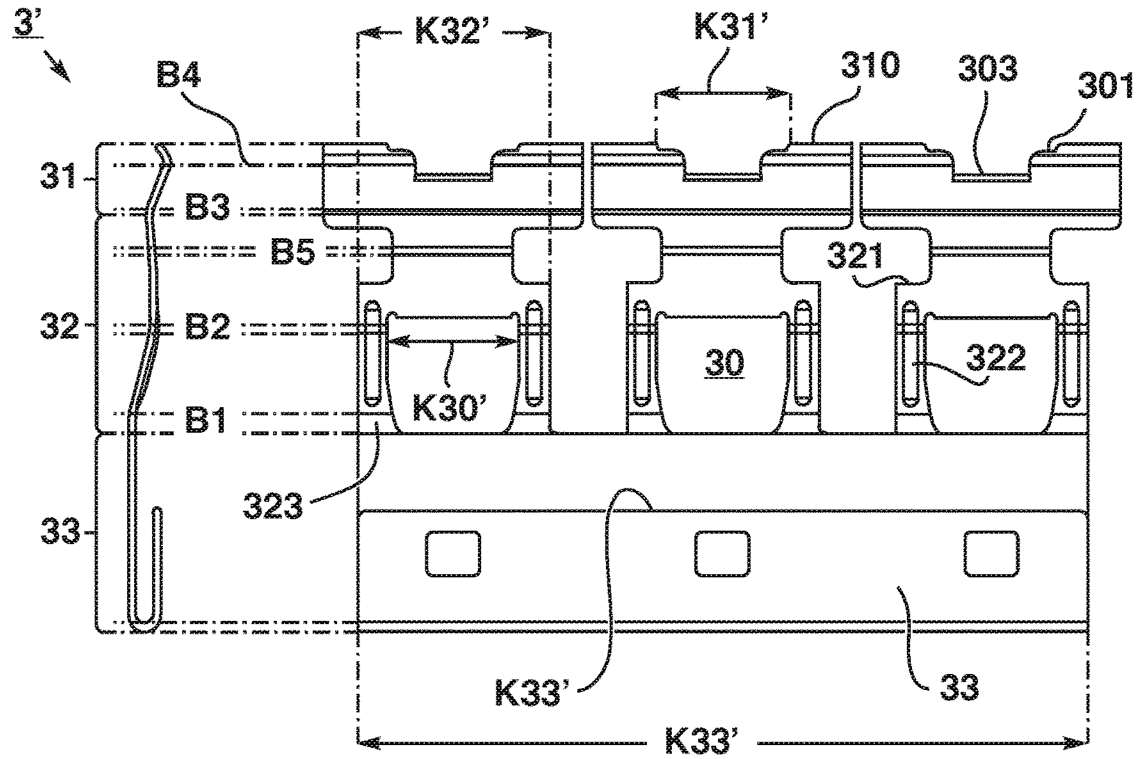
FIG. 8A shows a side and a front view of a first latch and spring element suitable for the first side wall of FIG. 3A according to a further embodiment.
Figure 8B:
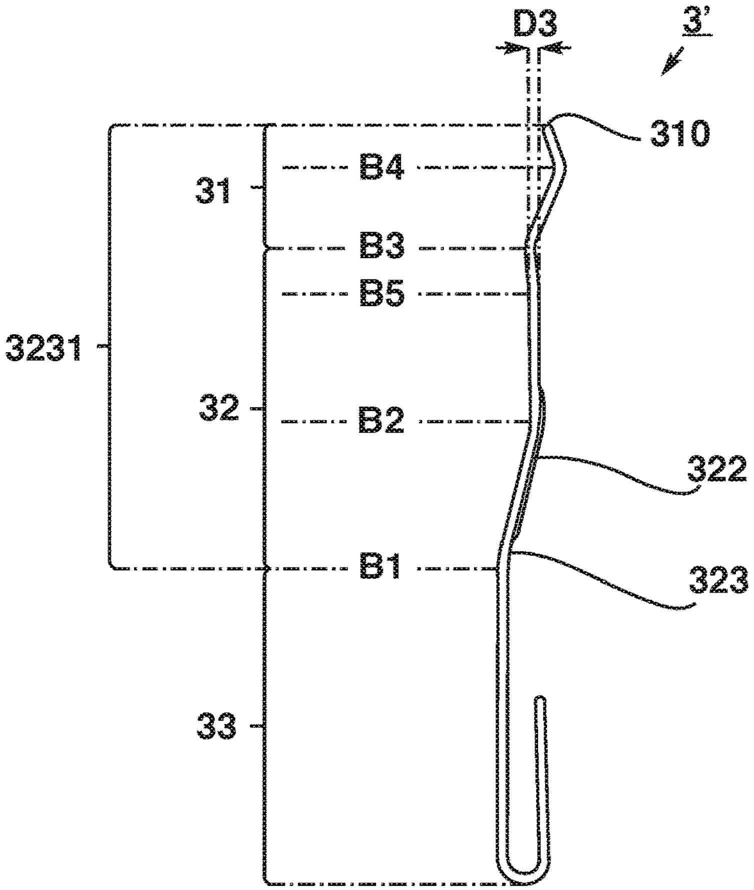
FIG. 8B shows an enlarged view of the first latch and spring element of FIG. 8A.

FIG. 8A shows a side view and a front view of a first latch and spring element 3' suitable for the above-described first side wall 2' according to this particularly preferred embodiment. FIG. 8B shows an enlarged view of a side view of the first latch and spring element 3'.

The latch and spring element 3' of this embodiment, with its fixing contour K33', its holding and guiding portion 3231 with the retaining contour K30', the guiding contour K31' and the first B1, second B2, third B3 and fourth B4 curvature and/or bending essentially corresponds to the embodiment of the first latch and spring element 3' described above.

At its free-standing end 310 this latch and spring element 3' is inclined inwards only slightly and unlike the above embodiment of the latch and spring element 3' has no bow 311. This free-standing end 310 thus enables a high dielectric strength against air and/or creepage distances with respect to electrical contacts of the connector module 4.

The first latch and spring element 3' comprises, as the already described latch and spring element 3' above, the central further recess 303 to allow the already mentioned advantageous function of said catching funnel.

The holding and guiding portion 3231 of the latch and spring element 3' also has a fifth curvature and/or bending B5 in its section between the second curvature and/or bending B2 and the third curvature and/or bending B3. Subsequently, the holding and guiding portion 3231 extending opposite the insertion direction R4 out of the base frame 200 and extending beyond the posts 21 is slightly inwardly inclined relative to the side wall 2' of the base frame 200.

By this measure, an advantageous bending behavior of the holding and guiding portion 3231 during insertion and removal of a connector module 4 is ensured.

In this case, the holding and guiding portion 3231 extends during the insertion and removal of the connector module 4 in its area between the second B2 and third B3 curvature and/or bending by only a small amount substantially parallel to the insertion direction R4 or at least changes its direction so little that an unlatching of the connector modules 4 in the installed state of the holding frame 1 is possible.

At the same time, the latch and spring element in this form is also suitable for maintaining the required clearances and creepage distances, because it maintains a comparatively large distance from the latched connector module 4.

In a particularly suitable embodiment, the latch and spring element 3' has a thickness D3 of 0.3 mm to 0.4 mm and particularly advantageously of 0.35 mm, so that the latch and spring element 3' in particular has a favorable bending behavior at its bending point 323 and also protrudes by a desirable small amount transversely to the insertion direction R4 beyond a latching lug 40 of the connector module for removal and/or insertion of a connector module 4 from/in the holding frame 1.

A second latch and spring element 3" has substantially the same features of the first latch and spring element 3' described above, but is designed correspondingly in its dimensions with the second side wall 2" of the base frame 200 and the second latching lug 40 of the connector module 4.

Such a second latch and spring element 3", together with the first latch and spring element 3', are also suitable for polarizing the plug connector modules 4 during insertion into the holding frame 1.

Figure 9A:
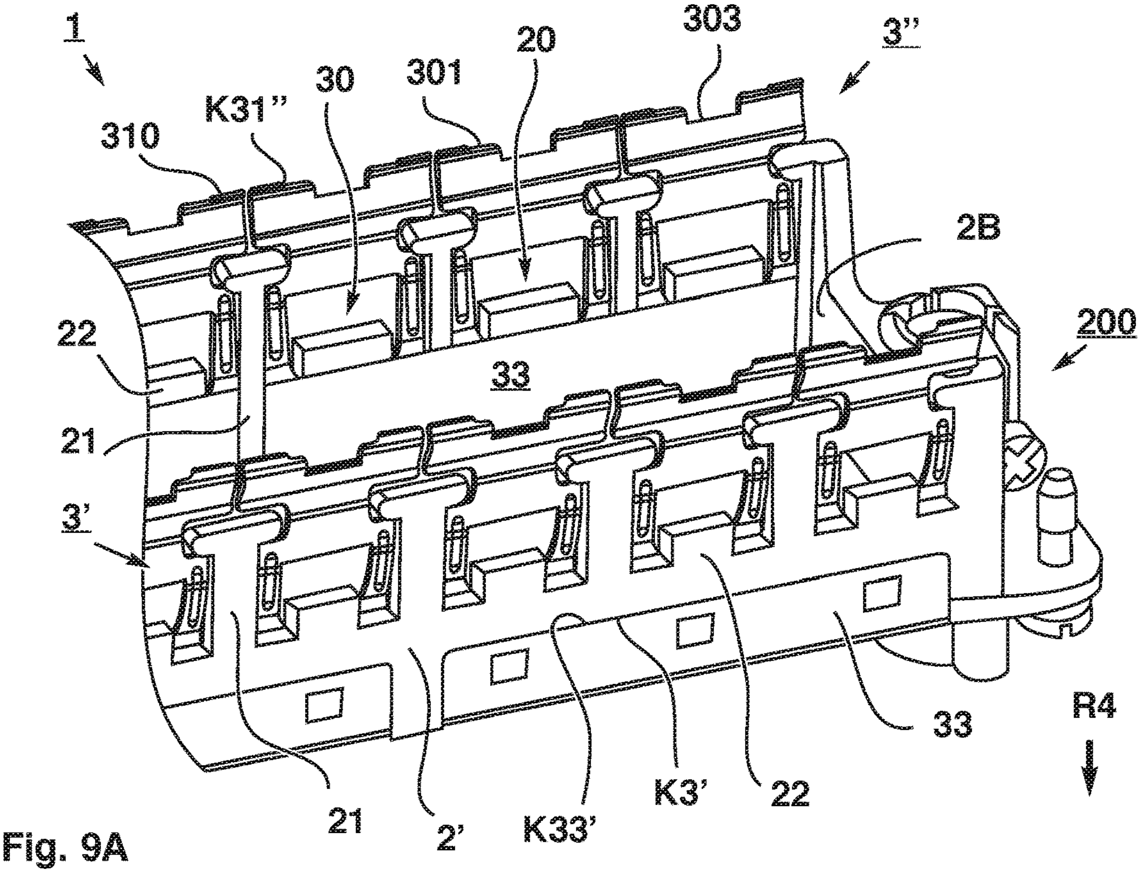
FIG. 9A shows a perspective view of a holding frame fully equipped with latch and spring elements according to an embodiment.

FIG. 9A shows a perspective view of a section of the holding frame 1 with a view of the first side wall 2'. The holding frame 1 is completely equipped with first and second latch and spring elements 3' and 3".

The two opposite side walls 2' and 2" of the holding frame 1 are designed to receive two latch and spring elements 3' and 3", each with three holding and guiding portions 3231, whereby the holding frame 1 can accommodate six connector modules 4.

The first side wall 2' has said first fixing contour K3' and said first side contour K2'. On the side wall 2', the two first latch and spring elements 3' are fixed with their first fixing contours K33'. The holding and guiding portions 3231 of the latch and spring elements 3' are each arranged with their holding portions 32 in a latching region 20 between two posts 21 of the first side wall 2'. In their further course the holding and guiding portions 3231 protrude with their free-standing ends 310 against the insertion direction R4 out of the base frame 200 of the holding frame 1.

The insertion recesses 301 provided on the free-standing ends 310 each form, with their other central recesses 303, a catching funnel for receiving the latching lug 40 of the connector module 4 and for the insertion of the connector module 4 in the holding frame 1. The insertion recesses 301 of the latch and spring elements 3' have first guiding contours K31', which are formed with a first holding and guiding contour K4' of a first latching lug 40 of the connector module 4 corresponding to the transverse direction of the insertion direction R4. In the holding portions 32 of the first latch and spring elements 3' locking windows 30 are formed. These latching windows 30 each have a first retaining contour K30' which corresponds to the retaining and guiding contour K4' of the first latching lug 40.

The rear side wall 2" in the drawing is provided by a second side wall 2" described above with a second fixing contour K3" and with a second side contour K2", wherein on the side wall 2" two second latch and spring elements 3" intended with their second fixing contours K33" are fixed. The holding and guiding portions 3231 of the latch and spring elements 3" are respectively arranged with their holding portions 32 in a latching region 20 of the side wall 2" between two posts 21 of the side wall 2". In their further course, the second holding and guiding portions 3231 project with their free-standing ends 310 out of the base frame 200 of the holding frame 1 against the insertion direction R4.

The second latch and spring elements 3" in this case each have a second holding contour K30" and a second guiding contour K31", which corresponds respectively with a second holding and guiding contour K4" of the connector module 4 in particular transversely to the insertion direction R4.

On the inside of the side walls 2' and 2" lowered terraces are provided, which are each formed corresponding to the inner legs of the latch and spring elements 3' and 3".

Figure 9B:
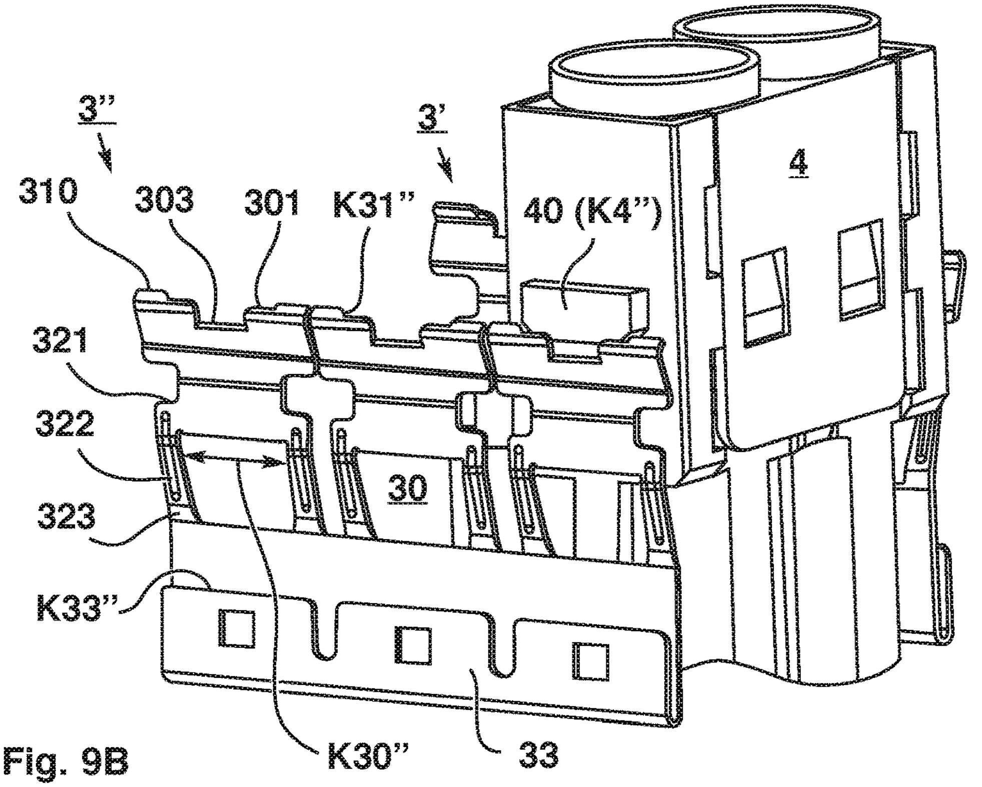
FIG. 9B shows two latch and spring elements of the holding frame of FIG. 9A together with a connector module.

FIG. 9B shows the two latch and spring elements 3' and 3" together with a connector module 4, but without the base frame 200. The second latch and spring element 3" is in the foreground and the first latch and spring element 3' is shown in the background.

The connector module 4 is partially inserted between the first 3' and second 3" latch and spring element in the insertion direction R4, wherein the second latching lug 40 with its second holding and guiding contour K4" in the catching funnel of the second latch and spring element 3" rests, which is formed by the insertion recess 301 with the second guiding contour K31" and the further recess 303. The first latching lug 40 rests, concealed in the drawing, with its first holding and guiding contour K4' on the catching funnel of the also largely concealed first latch and spring element 3' of the insertion recess 301 which is formed by the guiding contour K31' and the other recess 303.

Now the connector module 4 can be further inserted in the insertion direction R4 in the holding frame 1, for which only a pressure in the insertion direction R4 from above on the connector module 4 is required.

The holding and guiding portions 3231 of the latch and spring elements 3' and 3" are bent reversibly outward at the bending point 323 in the latching regions 20 of the side walls 2' and 2". For a simple insertion of the connector module 4, a chamfer 302 designed as an inlet bevel is provided on the insertion recesses 301.

The connector module 4 slides during insertion in the insertion direction R4 until the locking window 30 of the latch and spring element 3' with its holding contour K30' latches with the holding and guiding contour K4' of the first latching lug 40 of the connector module 4 and the latching window 30 of the latch and Spring element 3" with its holding contour K30" latches with the holding and guiding contour K4" of the second latching lug 40 of the connector module 4, and then the connector module is inserted and housed in the holding frame 1 as intended. In this position, the holding and guiding portions 3231 of the latch and spring elements 3' and 3" have returned to their relatively relaxed state with their latching lugs 40 latched with the windows 30, and the latching lugs 40 each rest on a pedestal 22 of the side wall 2' and 2" with their lower edges. The latching windows 30 engage with their retaining contours K30' and K30" transversely to the insertion direction R4 and, with their edge opposite to base 22, each engage with the holding and guiding contours K4' and K4" of the latching lugs 40.

Figure 10A:
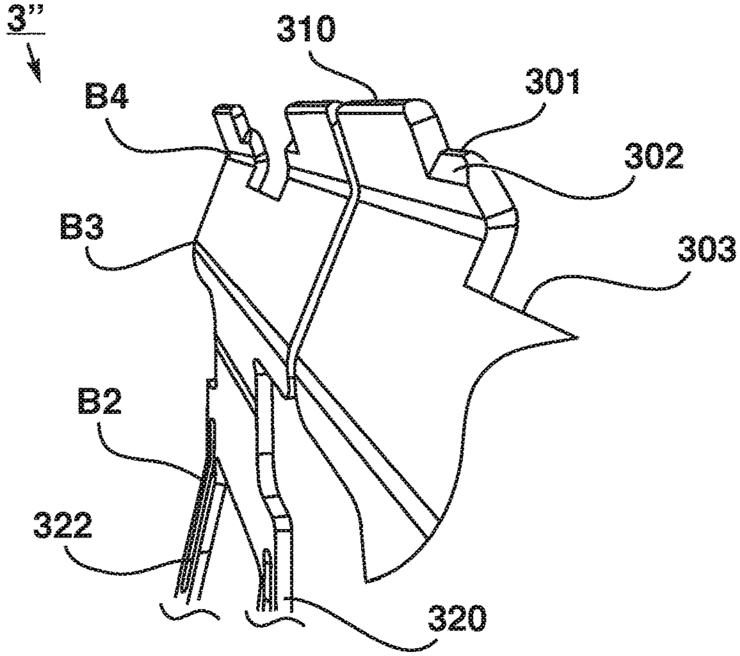
FIG. 10A shows an enlarged perspective view of a section of the latch and spring element of FIG. 9B.

FIG. 10A shows an enlarged perspective view of a detail of a latch and spring element 3".

The catching funnels formed on the free-standing ends 310 of the latch and spring element 3" by means of the insertion recesses 301 and their further recesses 303 each have the guiding contour K31" which is formed correspondingly to the holding and guiding contour K4" of the latching lug 40 of the connector module 4 transverse to the insertion direction R4. The guiding contour K31" of the insertion recesses 301 is provided, like the holding and guiding contour K4" of the latching nose 40, respectively transversely to the insertion direction R4, in particular by means of the width of the insertion recesses 301 and in particular the width of the latching lug 40.

This allows a particularly easy insertion of a connector module 4 in the holding frame 1. The connector module 4 only must be placed the catching funnel with its latching lugs 40 and experience a force acting in the insertion direction R4. For this facilitated insertion, a chamfer 302 designed as an inlet chamfer is provided on the insertion recesses 301, which chamfer is designed as an inlet bevel for the latching lugs. The further recesses 303 are provided during insertion of the connector module 4 in particular for receiving the plug-side edge of the latching lug 40, which may have the aforementioned two chamfers 41.

Figure 10C:
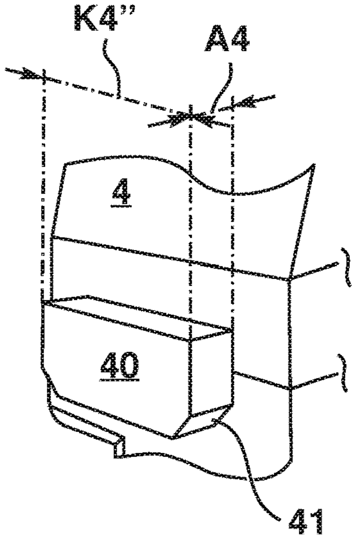
FIG. 10C shows an enlarged section of the connector module.
Figure 10B:
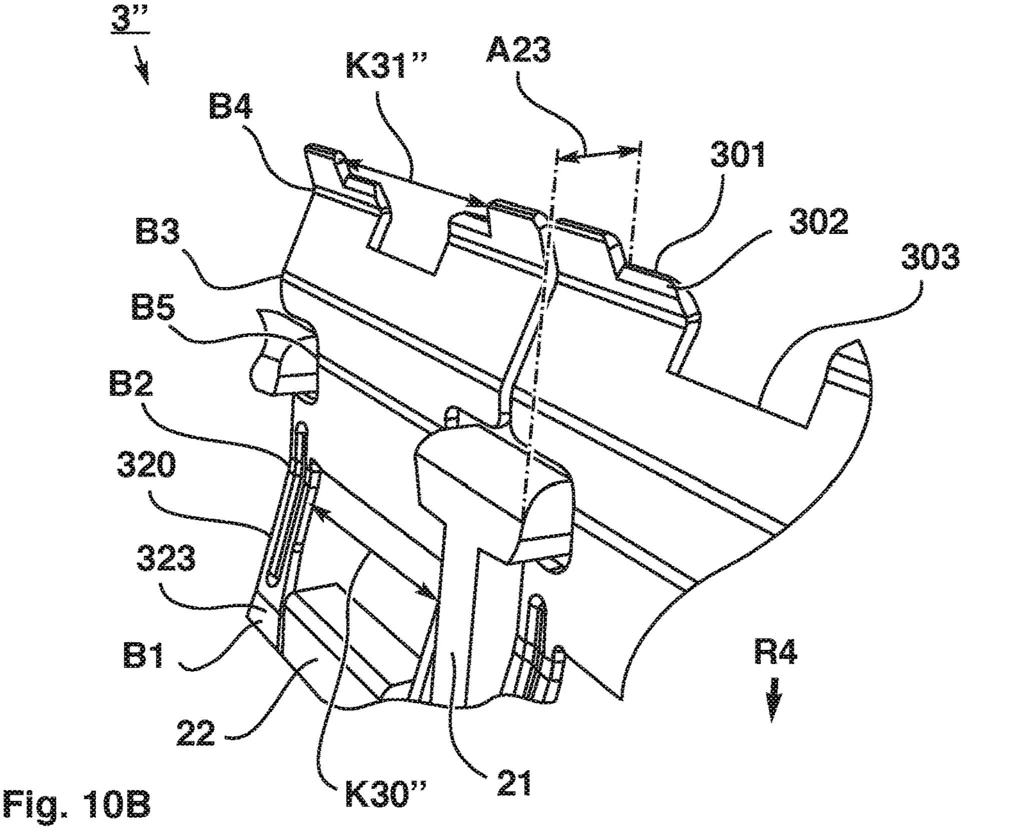
FIG. 10B shows an enlarged perspective view of a section of the holding frame of FIG. 9A.

FIG. 10B shows a further illustration of the latch and spring element 3" on a holding frame 1. FIG. 10C shows an enlarged section of a plug-in connector module 4, comprising its latching lug 40.

A side wall 2" and a latch and spring element 3" of the holding frame 1 are formed and arranged such that a distance A23 between the inside surface of the holding frame 1 and the outer edge of the inlet slope 302 corresponds with the distance A4 of the front edges of Latching lug 40 of the side wall 2" of the connector module 4 such that a correctly inserted connector module 4 rests with its front edges of the chamfers 41 on the inlet slopes, resting with its latching lugs 40 up to the insertion recesses 301 in the holding frame 1, and the lower edge of the latching lug 40 is arranged in the further recess 303.

It will be understood that in a connector module 4 which contacts with its opposite sidewalls 2' and 2" the inside of the first and second sidewalls 2' and 2", the shortest distance A23 is slightly greater than the distance A4.

Figure 11A:
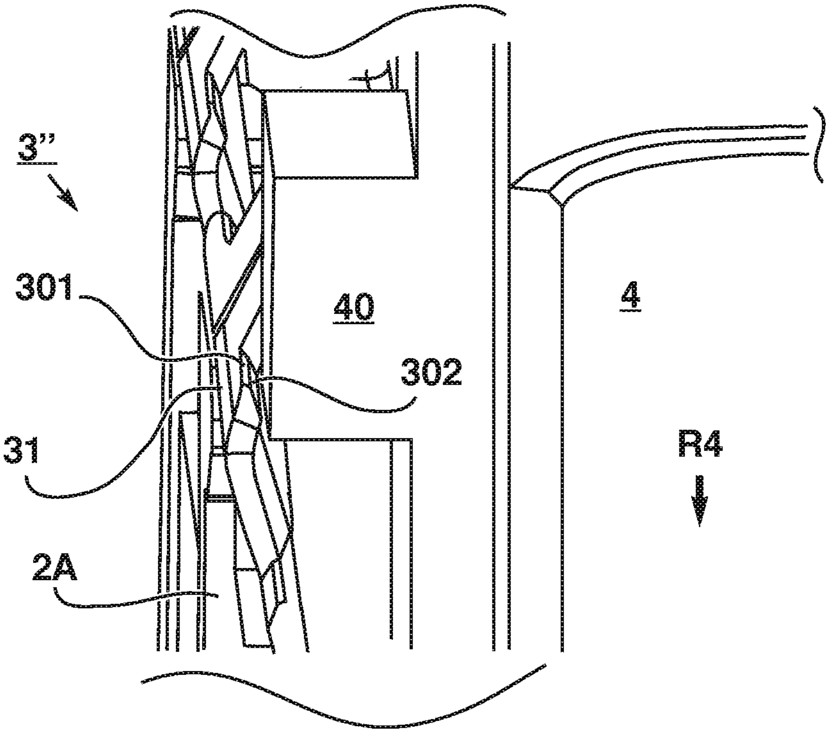
FIG. 11A shows an enlarged view of a section of the holding frame with the partially inserted connector module.

FIG. 11A shows an enlarged view of a section of the holding frame 1 with the partially inserted connector module 4. The latching lug 40 is, as described above, arranged at the corresponding insertion recess 301, wherein no chamfer 41 is shown at the latching lug 40 for clarity and presentation reasons. The insertion recess 301 of this embodiment has the suitably formed chamfer 302. By means of the cooperation of the chamfer 302 of the insertion recess 301 with the plug-side edge of the connector module 4, the connector module 4 can be pressed into the holding frame 1 particularly simple and without entanglement in the insertion direction R4.

Figure 11B:
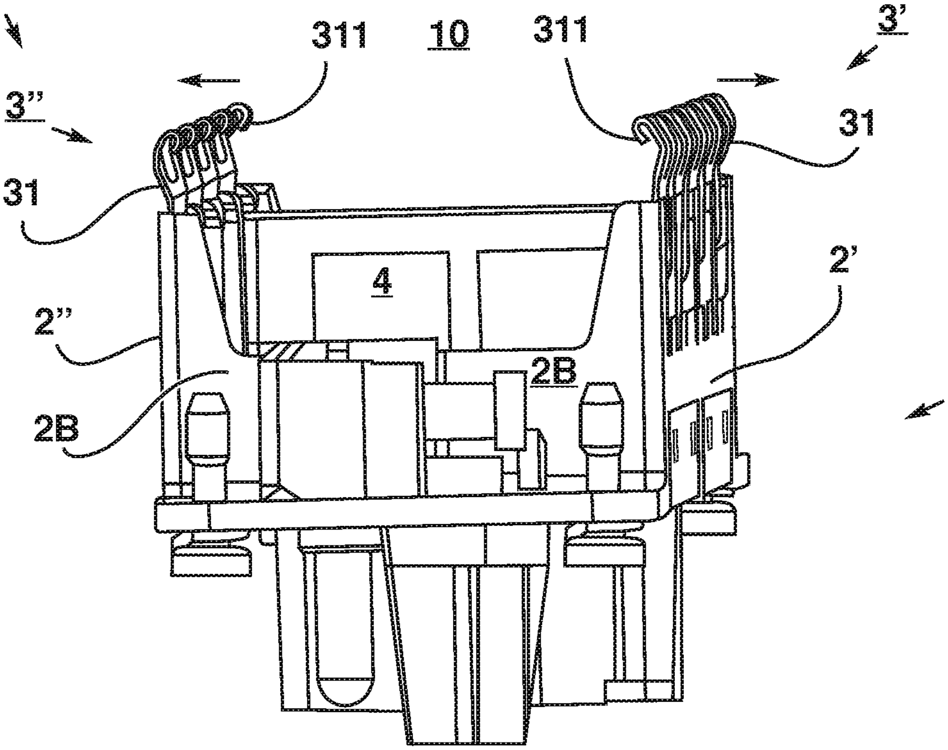
FIG. 11B shows another perspective view of the holding frame of FIG. 6B.

FIG. 11B shows a further perspective illustration of a holding frame 1 provided with first 3' and second 3" latch and spring elements, with a view on a transverse wall 2B. In the holding frame, a connector module 4 is ultimately introduced.

The first and second guiding portion 31 of the first 3' and second 3" latch and spring elements is directed to the outside at the third curvature and/or bending B3. Following this, the first and second guiding portion 31 in the fourth curvature and/or bending B4 is bent inward and/or angled in the opposite direction to the third curvature and/or bending B3. At the free-standing end 310 of the inwardly placed U-shaped bend 311 is formed and arranged such that the guiding portion 31 is sufficiently spaced from the connector module 4 to maintain air and creepage distances.

Thus, a manual spreading of the holding and guiding portion 3231 to the outside for unlocking and removal of the connector module 4 is possible. For this, engagement in particular on the bow 311 is possible. Due to the particularly advantageous shape of the latch and spring elements 3' and 3" this is especially also possible in the installed state of the holding frame 1, so even if the holding frame 1 is installed, for example, in a mounting housing 5.

Figure 12A:
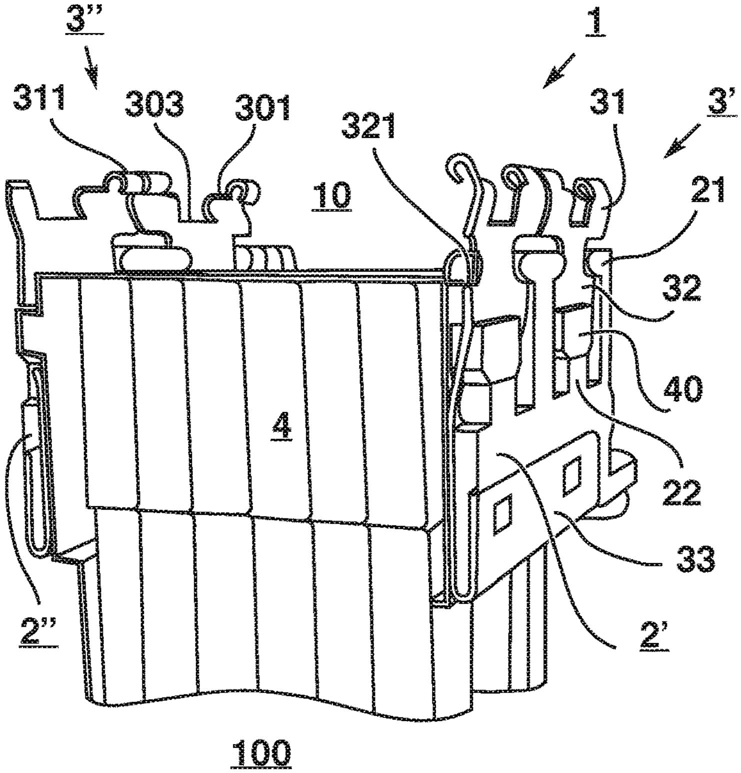
FIG. 12A shows a section through the holding frame of FIG. 11B.

FIG. 12A shows a section parallel to the insertion direction R4 through the holding frame 1 in a slightly different perspective for clarity. FIG. 12B shows a schematic side view of a latch and spring element 3' of the holding frame 1. The holding frame 1 is equipped with two connector modules 4.

The above-described holding and guiding portion 3231 of the latch and spring element 3' has a particularly advantageous sectional contour. The holding portion 32 extends with its webs 320 on the upper edge of the side wall 2' inclined from the inside outwards against the insertion direction R4 and adjacent to the posts 21 in the latching region 20. The shoulders 321 of the holding portion 32 are each arranged adjacent to a crossbar of post 21.

Thereafter, the holding portion 32 extends in the opposite direction to the insertion direction R4 exceeding the posts 21 out of the base frame 200, wherein the holding portion 32 is particularly advantageous approximately parallel to the side wall 2'. In this direction, the guiding portion 31 subsequent to the holding portion 32 is first bent and/or angled with the third curvature and/or bending B3 outwardly and then bent and/or angled inwardly with the fourth curvature and/or bending B4 and finally, with its free-standing end 310, bent inwardly such that said U-shaped bend 311 is provided.

The webs 320 of the holding portion 32 in this case have an embossing 322 as described above, which is designed and arranged such that the bending point 323 of the holding and guiding portion 3231 is particularly advantageously arranged adjacent to the fixing portion 33 at the cable connection side, i.e. in the figure, at the upper edge of sidewall 2' and/or adjacent to the first curvature and/or bending B1. The latch and spring element 3' with the holding and guiding portion 3231 with the above features is as said particularly suitable for a housing of a connector exhibiting little space for bending and/or spreading, which may be in particular a mounting housing of a wall of a cabinet.

Figure 12C:
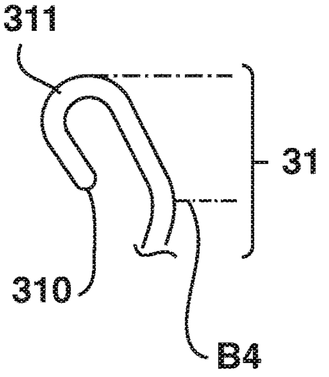
FIG. 12C shows an enlarged view of the section A of the guiding portion of the latch and spring element of FIG. 12B.
Figure 12D:
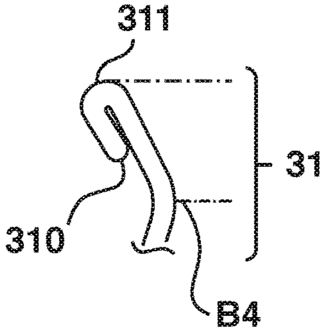
FIG. 12D shows a modification of the guiding portion of FIG. 12C.
Figure 12B:
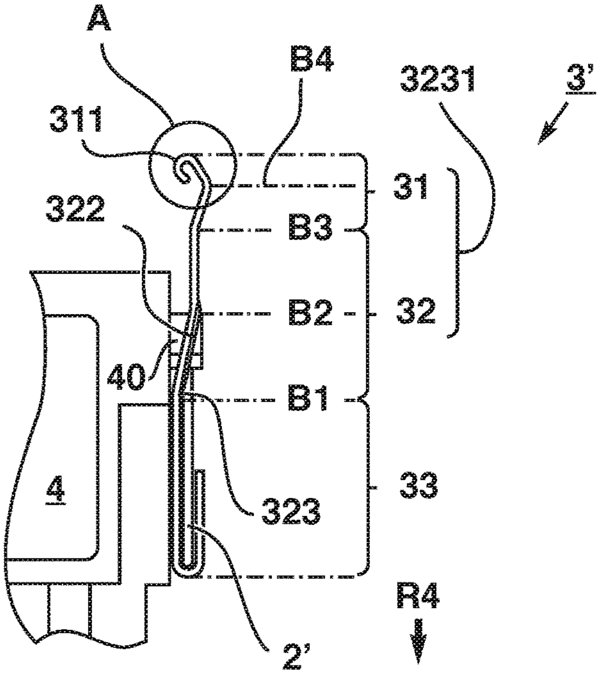
FIG. 12B shows a schematic side view of a latch and spring element of the holding frame of FIG. 12A.

FIG. 12C shows an enlarged view of the section A of the guiding portion 31 of the latch and spring element 3' of FIG. 12B.

The guiding portion 31 is bent as described above with its free-standing end 310 extending inwardly in the direction opposite to the insertion direction R4 in a substantially U-shaped bend 311, the outer elongated leg of the U-shaped bend 311 is particularly suitable for easy insertion of the holding frame 1 in a housing 5.

It is clear that a protruding bend 311 of the guiding portion 31 can also be designed, for example, as a U-shaped bend 311 with contacting limbs or, in particular, as a closed O-shaped bend 311.

FIG. 12D shows a modification of the guiding portion 31 formed such that the two legs of the U-shaped bend 311 are located adjacent to each other and the free-standing end 310 is in contact with the inside of the guiding portion 31. The guiding portion 31 of this embodiment is particularly advantageous for large size connector modules 4 that extend, for example, far into the cable termination area. In addition, the guiding portion 31 with its compact design offers a particularly advantageous electrical voltage resistance.

Figure 12E:
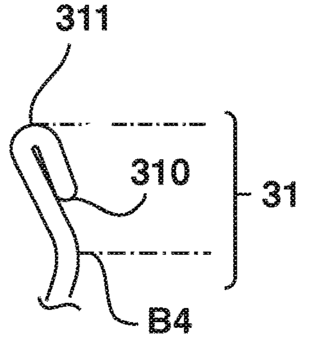
FIG. 12E shows a modification of the guiding portion of FIG. 12D.

FIG. 12E shows a further modification of the guiding portion 31, in which the legs of the U-shaped bend 311 are arranged adjacent to one another and formed such that the free-standing end 310 is bent outward. Also, the guiding portion 31 of this embodiment is particularly compact and has, in particular with its outwardly bent free-standing end 310, an advantageous electrical voltage resistance.

Figure 12F:
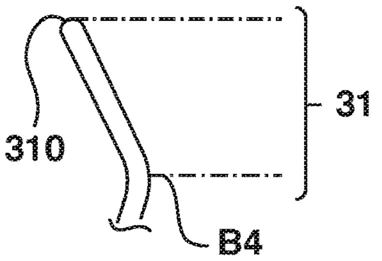
FIG. 12F shows another modification of the guiding portion of FIG. 12C.

FIG. 12F shows a further modification of the guiding portion 31, in which no bend 311 is formed at the free-standing end 310 curved inwards with the fourth curvature and/or bending B4, so that the corresponding latch and spring element 3' has an advantageous electrical voltage resistance as described above.

Figure 13A:
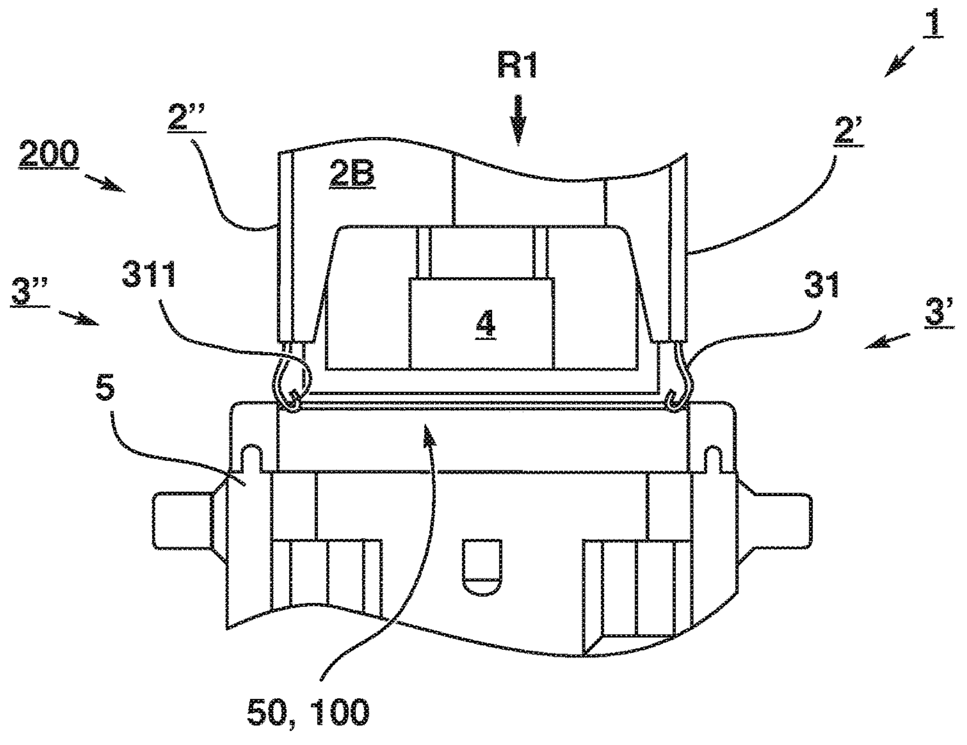
FIG. 13A shows a detail of a holding frame according to an embodiment in its intended insertion into a housing of a connector.

FIG. 13A shows a section of a holding frame 1 according to a further embodiment when it is inserted in direction R1 in a housing 5 of a connector, wherein the guiding portions 31 of the latch and spring elements 3' and 3" are arranged at one edge of the housing 5. Here, the housing 5 is shown in a section.

By means of the guiding portions 31 which are bent inwardly in a U-shaped bend 311 at their free-standing ends 310 and which in particular protrude beyond the connector module 4 and the side walls 2' and 2" out of the base frame 200 of the holding frame 1 in the direction R1, the holding frame 1 can also be introduced into a housing 5 with an insertion opening 50 in a simple manner, the dimension of the insertion opening 50 substantially correspond to the dimension of the base frame 200 of the holding frame 1.

When inserting the holding frame 1 in the housing 5, the holding and guiding portions 3231 of the latch and spring elements 3' and 3", lying opposite to each other in relation to the side walls 2' and 2" of the base frame 200, by means of bends 311 cooperating with the edge of the insertion opening 50 and in particular by means of their outer elongated legs of their guiding portions 31 are bent inwardly such that the free-standing ends 310 of the guiding portions 31 cannot get stuck at the edge of the insertion opening 50 of the housing 5. The insertion opening 50 can be, in particular, the opening of the housing 5 assigned to a plug face of the plug connector, on which the holding frame 1 intended for insertion into the housing 5 is arranged with its plug-in opening 100 for insertion into the housing 5.

An above-described simple insertion of the holding frame 1 in the housing 5 has been exemplified by spring elements 3' and 3" with U-shaped bends 311 of their guiding portions 31 and is, as mentioned above, also possible with latch and spring elements 3' and 3", which free-standing end 310 is bent inwards. An inner contour, in particular of an insertion opening 50 of the housing 5, can advantageously also slide on the outer side of the free-standing end 310 which is turned inward with the fourth curvature and/or bending B4, and bend a latch and spring element 3' and 3", if necessary, during its insertion reversibly inwards.

Figure 13B:
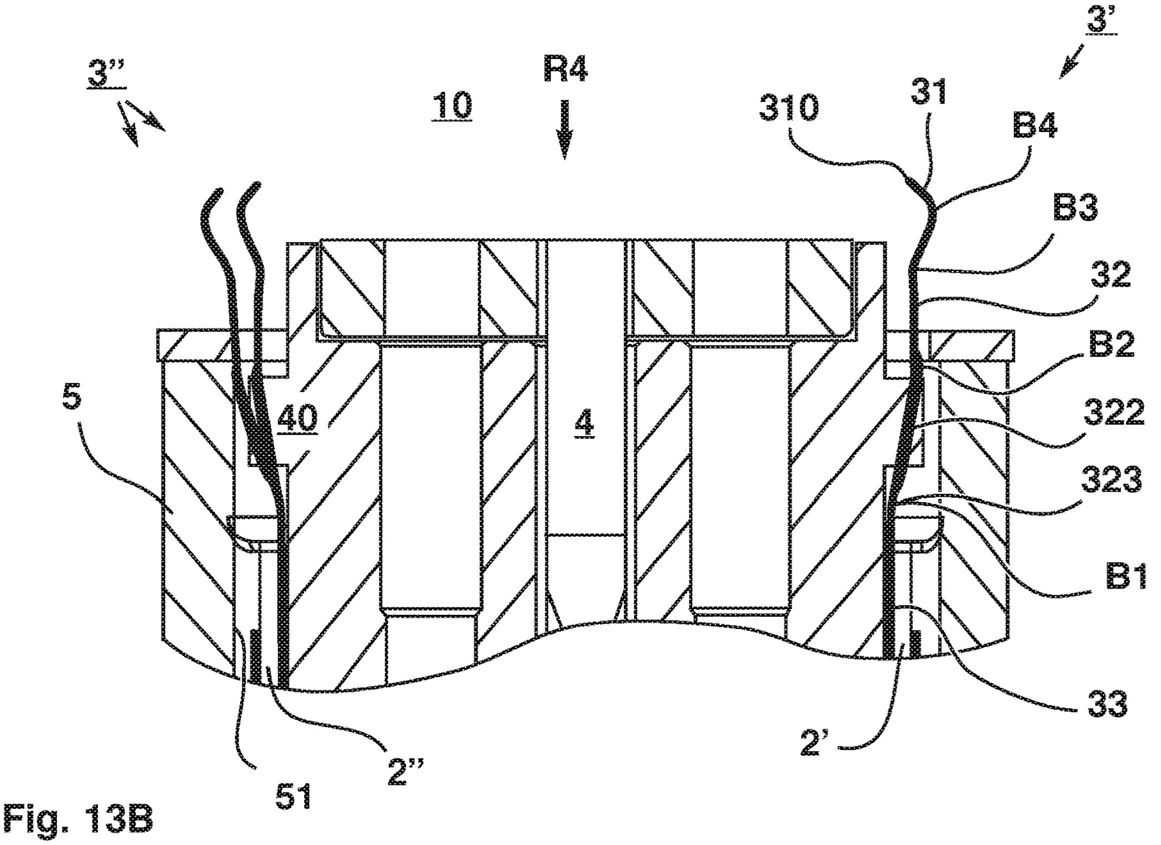
FIG. 13B shows a detailed view of a plug-in module installed in a holding frame according to an embodiment of the disclosure, wherein the holding frame is installed as intended in a housing of a connector.

FIG. 13B shows a section of the connector module 4 arranged according to a further embodiment in a holding frame 1, wherein the holding frame 1 is intended to be installed in a housing 5 of a connector, which may in particular be a mounting housing on a wall of a control cabinet.

For the sake of clarity, the latch and spring elements 3' and 3" of the holding frame 1 are black and the cut surfaces shown hatched. The latch and spring element 3' on the right in the drawing is locked as intended with the latching lug 40 of the connector module 4. The latch and spring element 3' opposite to the right latch and spring element 3' is shown in its latched state with the latching lug 40 and relatively relaxed state and also in a displaced and/or bent state. In the displaced and/or bent state, the latch and spring element 3" with its holding and guiding portion 3231 is bent outwardly such that the left latching lug 40 of the connector module 4 is unlatched and exposed for removal of the connector module 4 from the holding frame 1 and the housing 5.

The holding frame 1 is intended to be installed in the housing 5, wherein in particular the guiding portion 31 and the free-standing end 310 of the latch and spring elements 3' and 3" on the cable connection side opening 10 of the holding frame 1 are accessible for removal of the connector module 4 and/or protrude from the housing 5.

In particular, by means of its guiding portion 31 protruding from the housing 5 in the opposite direction to the insertion direction R4 and the holding portion 32, which also has the stamping 322 and the bending point 323, even with a small gap between the inside 51 of the housing 5, the holding state of the holding and guiding portion 3231 of the latch and spring elements 3' and 3" can be converted into an operating state in which an insertion and a locking and removal of the connector module 4 in or out of the holding frame 1 is made possible.

In particular, the projecting guiding portion 31 projecting out of the housing 5 and the protruding area of the holding portion 32, the embossing 322 and the bending point 323 are advantageously designed and arranged in such a way that the holding and guiding portion 3231 in particular during the bending and/or spreading thereof is reversibly bent at the bending point 323. In this case, in particular also the area projecting out of the holding frame 1 in the opposite direction to the insertion direction R4 between the second curvature and/or bending B2 and the third curvature and/or bending B3 of the holding portion 32 is shifted by a predetermined small amount essentially transverse to the insertion direction R4 parallel to the inside 51 of the housing 5.

The latch and spring elements 3' and 3" with the holding and guiding portion 3231 with the above features are therefore, as stated above, particularly suitable for a housing 5 of a connector having little space for bending and/or spreading, in particular a mounting housing 5 of a wall of a cabinet.

Figure 14A:
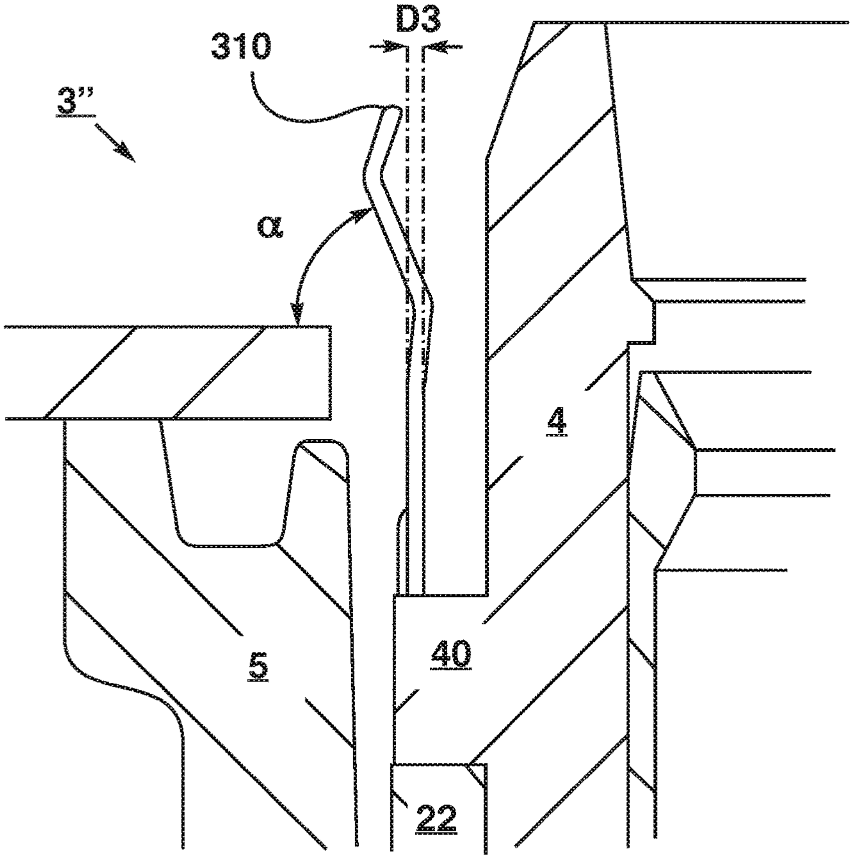
FIG. 14A shows a detailed view of a plug-in module installed in a holding frame according to an embodiment of the disclosure, wherein the holding frame is installed as intended in a housing of a connector.

FIG. 14A shows an enlarged detail of the connector module 4 inserted into the holding frame 1, wherein the holding frame 1 is installed in the housing 5 as intended.

Figure 14B:
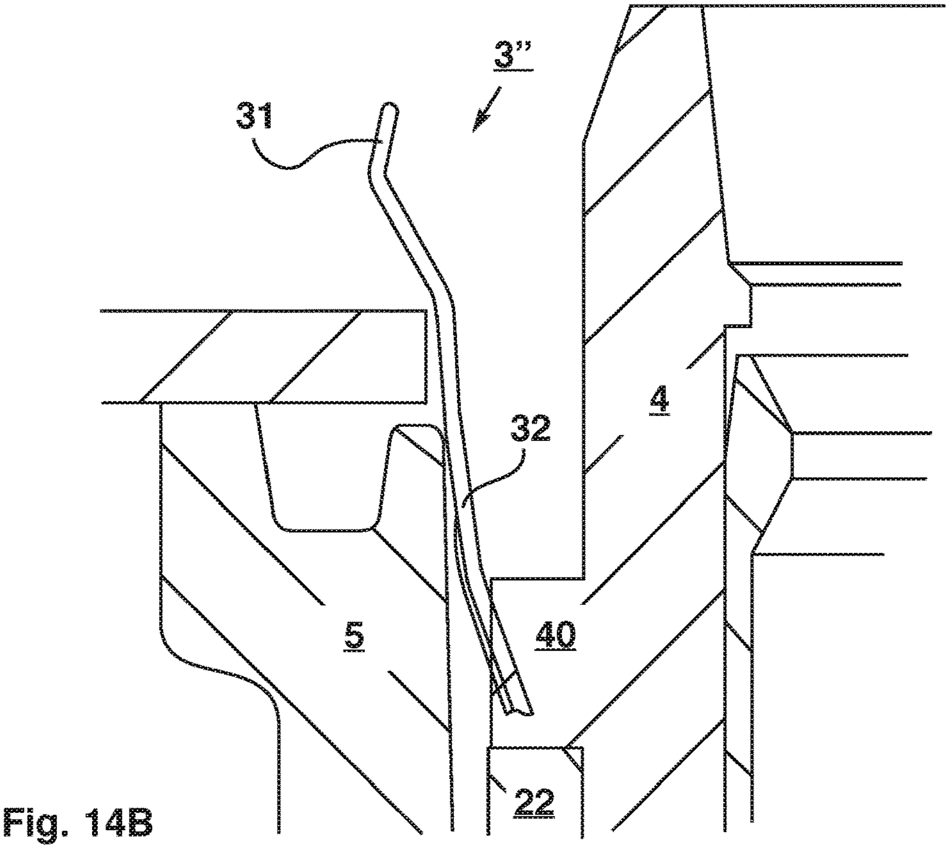
FIG. 14B shows the connector module of FIG. 14A in its intended insertion and/or its removal from the holding frame.

FIG. 14B shows the connector module 4 during its insertion and removal as intended from the holding frame 1.

The holding frame 1 with its base frame 200 having two opposite side walls 2' and 2", each formed with latch and spring elements 3' and 3", is designed such that the connector module 4 inserted into the holding frame 1 is locked with its latching lug 40 in the latching window 30 of the latch and spring element 3" and rests with the latching lug 40 on the base 22 of the side wall 2". The latch and spring element 3" is designed such that the latching window 30 of the latch and spring element 3" rests with its upper edge on the latching lug 40 and is spaced from the side wall of the connector module 4 such that the connector module is held safely and stationary by the holding frame 1. In this case, the latch and spring element 3" is designed and arranged such that the latching lug 40 of the connector module 4 can be unlatched by means of a small displacement of the holding portion 32 of the latch and spring element 3" outwardly towards an inner wall of the housing 5, after which the connector module 4 is exposed for removal from the holding frame 1 installed in the housing 5.

The latch and spring element 3" is designed such that the guide portion 31 of the latch and spring element 3" is bendable by an angle $\alpha$ of 60° to 80° and preferably by an angle $\alpha$ of 65° to 75° and particularly advantageous by about 70°. The latch and spring element 3" is further designed such that the holding portion 32 with its region extending substantially opposite to the insertion direction R4 and parallel to the insertion direction R4 between the second B2 and third B3 curvature and/or bending during insertion and at removal of the connector module 4 in the holding frame 1 is moved substantially parallel or at least only rotated by such a slight angle that unlocking is also possible in the installed state.

In other words, the translational movement portion necessary to enable the insertion and/or removal of the connector module 4 is at least greater than the much smaller portion of the rotational movement of said area. Ideally, this region of the latch and spring element 3', 3" is moved outwards in the form of a parallel displacement. As a result, overall space is saved e.g. during the removal process. Thus, the removal of the connector module 4 from the holding frame 1 in the installed state, i.e. when the holding frame 1 is installed for example in a mounting housing 5, becomes possible.

By this measure, therefore, the possibility is advantageously created not only to insert the connector module 4 in a holding frame 1 already installed in a housing 5, but also in particular, for removal from the holding frame 1. In this case, the inside of the housing 5 can have only a small distance to the holding frame 1 and the latching lug 40 of the connector module 4. Finally, said at least largely parallel displacement of the holding portion 32 by a predetermined small amount allows unlocking and thus removal of the connector module 4.

The above regarding the latch and spring element 3" applies analogously to the latch and spring element 3', not shown in the drawing.

Although various aspects or features of the invention are shown in combination in the figures, it will be apparent to those skilled in the art, unless stated otherwise, that the combinations illustrated and discussed are not the only ones possible. In particular, corresponding units or feature complexes from different embodiments can be exchanged with one another.

LIST OF REFERENCE NUMBERS

1 holding frame
10 cable connection side opening
100 plug-in opening
200 base frame
2, 2', 2" sidewall, first sidewall, second sidewall
2B partition
20 rest area
21 post (T- and L-shaped)
22 base
23 lowered terrace
231 spigot
3, 3', 3" latch and spring element, first latch and spring element, second latch and spring element
30 latching means, latching window
301 insertion recess
302 bevel, inlet slope
303 further recess
31 guiding portion
310 free-standing end
311 bow
32 holding portion
320 web
321 shoulder
322 stiffening, embossing
323 inflection point
3231 holding and guiding portion, tab
33 fixing
331 mounting recess
4 connector module
40 locking nose, locking element
41 Contour, bevel
5 housing, mounting housing
50 insertion
51 inside
α angle
A neckline
A4, A23 distance
B1, B2, B3, B4, B5 curvature and/or bending
D3 thickness, strength
K2', K2" first side contour, second side contour (side wall)
K3', K3" first fixing contour, second fixing contour (side wall)
K4, K4', K4" holding and guiding contour, first holding and guiding contour, second holding and guiding contour (connector module)
K30, K30', K30" holding contour, first holding contour, second holding contour (latch and spring element)
K31, K31', K31" Guiding contour, first guiding contour, second guiding contour (latch and spring element)
K32', K32" first side contour, second side contour (latch and spring element)
K33', K33" first fixing contour, second fixing contour (latch and spring element)
R1, R3, R4 direction
S line

The invention claimed is:

1. A holding frame (1) for a connector having connector modules (4), the holding frame (1) comprising:
- a base frame (200) having
  - two longitudinal side walls (2, 2', 2") parallel opposite to each other, namely a first side wall (2, 2') and a second side wall (2, 2"),
  - two mutually parallel transverse walls (2B) at right angles, and
  - integral latch and spring elements (3, 3', 3"), including
    - at least one first latch and spring element (3, 3") mounted on the first side wall (2, 2'"), and
    - at least one second latch and spring element (3, 3") mounted on the second side wall (2, 2'"),
- wherein the base frame (200) with its transverse walls (2B) and its side walls (2; 2', 2") has a rectangular cross-section, a cross-sectional area thereof defining a plane transverse to an insertion direction (R4) of the connector modules (4); and
- wherein the holding frame (1) has both a cable connection side opening (10) and opposite thereto a plug-side opening (100); and
- wherein the integral latch and spring elements (3, 3', 3") each have
  - at least one reversibly bendable holding and guiding portion (3231) for inserting a connector module (4) and for holding of the inserted connector module (4) and
  - a fixing portion (33) for its own (3; 3', 3") fixation on the respective side wall (2; 2', 2'"); and
- wherein at each holding and guiding portion (3231) a latch (30) is formed which has a holding contour (K30; K30', K30") with which a holding and guiding contour (K4; K4', K4") of the connector module (4) inserted into the holding frame (1) is latched while the connector module (4) is held in the holding frame (1);
- wherein the first side wall (2, 2') and second side wall (2, 2") each has a plurality of spaced apart posts (21) extending opposite to the insertion direction (R4);
- wherein two adjacent posts (21) on each sidewall (2', 2") each define a latching region (20) transversely to the insertion direction (R4); and
- wherein each latching region (20) has a side contour (K2', K2") defined by a shape of the respective posts (21); and
- wherein the holding and guiding portion (3231) has a holding portion (32) having a side contour (K32', K32"); and
- wherein in or on the holding portion (32), the latch (30) is formed; and
- wherein the holding and guiding portion (3231) has a first curvature and/or bending section (B1) which is arranged and configured such that the holding portion (32) engages with the latch (30) and protrudes by a predetermined amount into the latching region (20); and
- wherein the holding and guiding portion (3231) has a second curvature and/or bending (B2), which is arranged and formed such that the holding portion (32) extends out of the latching region (20) opposite to the insertion direction (R4); and
- wherein the holding and guiding portion (3231) has a guiding portion (31) which extends beyond the insertion direction (R4) beyond the posts (21) of the side wall (2; 2', 2''') and has a free-standing end (310); and wherein the holding and guiding portion (3231) has a third curvature and/or bending (B3) outwardly, by which the guiding portion (31) is set outwardly by a predetermined amount; and wherein the guiding portion (31), towards its free-standing end (310), has a fourth curvature and/or bending (B4) inwards, and thus in the opposite direction to the third curvature and/or bending (B3), whereby the side walls (2; 2', 2") and the latch and spring elements (3; 3', 3") are adapted such that a cable connection side insertion and removal of the connector module (4) in/from the holding frame (1) installed in a mounting housing (5) of the connector is made possible.

2. The holding frame (1) according to claim 1, wherein said latch comprises a latching window (30) or is formed by the latching window (30).

3. The holding frame (1) according to claim 1, wherein each latch and spring element (3, 3', 3") comprises at least two of said holding and guiding portions (3231).

4. The holding frame (1) according to claim 1, wherein the posts (21) include T-shaped posts (21) and L-shaped posts (21), wherein the L-shaped posts (21) are arranged at the respective ends of each side wall (2', 2'''), and wherein the T-shaped posts (21) are arranged on the respective side wall (2', 2") between the L-shaped posts (21).

5. The holding frame (1) according to claim 1, wherein the guiding portion (31) is designed widened in its region extending beyond the side wall (2, 2', 2") transversely to the insertion direction (R4) and parallel to a side wall (2, 2', 2") such that two adjacent guiding portions (31) are arranged adjacent to each other and have a predetermined small distance.

6. The holding frame (1) according to claim 1, wherein the second (B2) and third (B3) curvature and/or bending are designed and arranged such that the holding and guiding portion (3231) is in an area extending between the second (B2) and third (B3) curvature and/or bending substantially parallel to the insertion direction (R4), and that at a bend of the holding and guiding portion (3231) outwardly for insertion or removal of the respective connector module (4) a movement of this area is largely in the form of a parallel displacement transversely to the insertion direction (R4).

7. The holding frame (1) according to claim 1, wherein the fixing portion (33) is formed in such a slender U-shape with an outer and inner leg extending parallel to the insertion direction (R4), that the fixing portion (33) with its outer and inner legs form fittingly encompasses a lower edge of the respective side wall (2', 2") such that the latch and spring element (3', 3") on the side wall (2', 2") of the base frame (200) is fixed, wherein the inner leg extends on an inside of the side wall (2', 2"), and wherein the holding and guiding portion (3231) is formed on the inner leg, and wherein the outer leg extends on an outside of the side wall (2', 2") and has a fixing contour (K33', K33"), and wherein the side wall (2', 2") has a further fixing contour (K3', K3") which is provided by a lowered terrace (23) on the outside of the side wall (2', 2'''), wherein the fixing contour (K33', K33") of the outer leg of the latch and spring element (3', 3''') in an assembled state form fittingly engages the further fixing contour (K3', K3") of the side wall (2', 2").

8. The holding frame (1) according to claim 1, wherein on the free-standing end (310) of the guiding portion (31) a guiding contour (K31; K31', K31") is provided which is formed correspondingly with the holding and guiding contour (K4; K4', K4") of the connector module (4) such that an insertion and also a fixation of the connector module (4) with a correctly polarization in a proper orientation in the holding frame (1) is possible, but that prevents insertion of the connector module (4) in a wrong polarization.

9. The holding frame (1) according to claim 8, wherein the guiding portion (31) has an insertion recess (301) having the guiding contour (K31; K31', K31") at its free-standing end (310).

10. The holding frame (1) according to claim 9, wherein the insertion recess (301) has a further recess (303) arranged centrally therein and/or a chamfer (302), so that a catching funnel for the holding and guiding contour (K4; K4', K4") of the connector module (4) is provided.

11. The holding frame (1) according to claim 1, wherein the holding frame (1) has a plurality of first (3') and a plurality of second (3") latch and spring elements which have an identical and/or a different number of holding and guiding portions (3231).

12. The holding frame (1) according to claim 11, wherein the plurality of first latch and spring elements (3') each have one or more holding and guiding portions (3231) with a first side contour (K32') and a first fixing contour (K33'), and wherein the plurality of second latch and spring elements (3") each have one or more holding and guiding portions (3231) with a second side contour (K32") and a second fixing contour (K33").

13. A holding frame (1) for a connector having connector modules (4), the holding frame (1) comprising:

a base frame (200) having two longitudinal side walls (2, 2', 2") parallel opposite to each other, namely a first side wall (2, 2') and a second side wall (2, 2'''), two mutually parallel transverse walls (2B) at right angles, and integral latch and spring elements (3, 3', 3"), including at least one first latch and spring element (3, 3") mounted on the first side wall (2, 2"), and at least one second latch and spring element (3, 3") mounted on the second side wall (2, 2"), wherein the base frame (200) with its transverse walls (2B) and its side walls (2; 2', 2") has a rectangular cross-section, a cross-sectional area thereof defining a plane transverse to an insertion direction (R4) of the connector modules (4); and wherein the holding frame (1) has both a cable connection side opening (10) and opposite thereto a plug-side opening (100); and wherein the integral latch and spring elements (3, 3', 3") each have at least one reversibly bendable holding and guiding portion (3231) for inserting a connector module (4) and for holding of the inserted connector module (4) and a fixing portion (33) for its own (3; 3', 3") fixation on the respective side wall (2; 2', 2'''); and wherein at each holding and guiding portion (3231) a latch (30) is formed which has a holding contour (K30; K30', K30") with which a holding and guiding contour (K4; K4', K4") of the connector module (4) inserted into the holding frame (1) is latched while the connector module (4) is held in the holding frame (1); and wherein the first side wall (2, 2') and second side wall (2, 2") each has a plurality of spaced apart posts (21) extending opposite to the insertion direction (R4); and wherein two adjacent posts (21) on each sidewall (2', 2") each define a latching region (20) transversely to the insertion direction (R4); and wherein each latching region (20) has a side contour (K2', K2") defined by a shape of the respective posts (21); and wherein the holding and guiding portion (3231) has a holding portion (32) having a side contour (K32', K32'"); and wherein in or on the holding portion (32), the latch (30) is formed; and wherein the holding and guiding portion (3231) has a first curvature and/or bending section (B1) which is arranged and configured such that the holding portion (32) engages with the latch (30) and protrudes by a predetermined amount into the latching region (20); and wherein the holding and guiding portion (3231) has a second curvature and/or bending (B2), which is arranged and formed such that the holding portion (32) extends out of the latching region (20) opposite to the insertion direction (R4); and wherein a section of the holding and guiding portion (3231) has a stiffening (322) arranged and formed such that a bending point (323) of the holding and guiding portion (3231) for reversibly bending the holding and guiding portion (3231) is arranged adjacent to a cable connection-side edge of the respective side wall (2, 2', 2"), whereby the side walls (2; 2', 2") and the latch and spring elements (3; 3', 3") are adapted such that a cable connection side insertion and removal of the connector module (4) in/from the holding frame (1) installed in a mounting housing (5) of the connector is made possible.

14. The holding frame (1) according to claim 13, wherein the latch and spring element (3, 3', 3") is made of resilient sheet metal as a punch and bent part and is provided with said stiffening by an embossment (322).

15. The holding frame (1) according to claim 13, wherein the stiffening (322) and the bending point (323) of the holding and guiding portion (3231) are adapted such that an outwardly directed movement of the holding and guiding portion (3231) transversely to the insertion direction (R4) necessary for the insertion and removal of the connector module (4) is minimized.

16. The holding frame (1) according to claim 13, wherein in each latching area (20) a base (22) for supporting a latch element (40) latched to the latch (30) of the connector modules (4) is arranged, and wherein the holding portion (32) has two opposite webs (320) extending from the fixing portion (33) by means of the first curvature and/or bending (B1) into the latching area (20), which webs engage the latch (30) transversely to the insertion direction (R4), wherein the webs (320) have said stiffening (322) adapted to arrange the bending point (323) of the holding and guiding portion (3231) on the webs (320) adjacent to the fixing portion (33) and to the base (22).

17. A holding frame (1) for a connector having connector modules (4), the holding frame (1) comprising:

a base frame (200) having two longitudinal side walls (2, 2', 2") parallel opposite to each other, namely a first side wall (2, 2') and a second side wall (2, 2"), two mutually parallel transverse walls (2B) at right angles, and integral latch and spring elements (3, 3', 3'"), including at least one first latch and spring element (3, 3") mounted on the first side wall (2, 2"), and at least one second latch and spring element (3, 3'") mounted on the second side wall (2, 2"), wherein the base frame (200) with its transverse walls (2B) and its side walls (2; 2', 2'") has a rectangular cross-section, a cross-sectional area thereof defining a plane transverse to an insertion direction (R4) of the connector modules (4); and wherein the holding frame (1) has both a cable connection side opening (10) and opposite thereto a plug-side opening (100); and wherein the integral latch and spring elements (3, 3', 3'") each have at least one reversibly bendable holding and guiding portion (3231) for inserting a connector module (4) and for holding of the inserted connector module (4) and a fixing portion (33) for its own (3; 3', 3") fixation on the respective side wall (2; 2', 2"); and wherein at each holding and guiding portion (3231) a latch (30) is formed which has a holding contour (K30; K30', K30") with which a holding and guiding contour (K4; K4', K4") of the connector module (4) inserted into the holding frame (1) is latched while the connector module (4) is held in the holding frame (1); and wherein the first side wall (2, 2') and second side wall (2, 2") each has a plurality of spaced apart posts (21) extending opposite to the insertion direction (R4); and wherein two adjacent posts (21) on each sidewall (2', 2") each define a latching region (20) transversely to the insertion direction (R4); and wherein each latching region (20) has a side contour (K2', K2") defined by a shape of the respective posts (21); and wherein the holding and guiding portion (3231) has a holding portion (32) having a first side contour (K32') and a second side contour (K32"); and wherein in or on the holding portion (32), the latch (30) is formed; and wherein the holding and guiding portion (3231) has a first curvature and/or bending section (B1) which is arranged and configured such that the holding portion (32) engages with the latch (30) and protrudes by a predetermined amount into the latching region (20); and wherein the holding and guiding portion (3231) has a second curvature and/or bending (B2), which is arranged and formed such that the holding portion (32) extends out of the latching region (20) opposite to the insertion direction (R4); and wherein the fixing portion (33) is formed in such a slender U-shape with an outer and inner leg extending parallel to the insertion direction (R4), that the fixing portion (33) with its outer and inner legs form fittingly encompasses a lower edge of the respective side wall (2', 2")

such that the latch and spring element (3', 3''') on the side wall (2', 2'') of the base frame (200) is fixed, wherein the inner leg extends on an inside of the side wall (2', 2''), and the holding and guiding portion (3231) is formed on the inner leg, and the outer leg extends on an outside of the side wall (2', 2'') and has a fixing contour (K33', K33''); and wherein the side wall (2', 2'') has a further fixing contour (K3', K3'') which is provided by means of a lowered terrace (23) on the outside of the side wall (2', 2''), wherein the fixing contour (K33', K33'') of the outer leg of the latch and spring element (3', 3'') in an assembled state form fittingly engages the further fixing contour (K3', K3'') of the side wall (2', 2'')

the first side wall (2') has a first fixing contour (K3') and the second side wall (2'') has second fixing contour (K3''), wherein the second fixing contour (K3'') is different of the first fixing contour (K3'), the first latch and spring element (3') has a first fixing contour (K33') which is designed to correspond with the first fixing contour (K3') of the first side wall (2') in a form-fitting manner, and the second latch and spring element (3'') has a second fixing contour (K33'') which is designed to correspond with the second fixing contour (K3'') of the second side wall (2'') in a form-fitting manner.

18. A system, comprising a plurality of holding frames (1) for connector modules (4), each of the holding frames (1) comprising a base frame (200) having two longitudinal side walls (2, 2', 2'') parallel opposite to each other, namely a first side wall (2, 2') and a second side wall (2, 2''), two mutually parallel transverse walls (2B) at right angles, and integral latch and spring elements (3, 3', 3''), including at least one first latch and spring element (3, 3'') mounted on the first side wall (2, 2''), and at least one second latch and spring element (3, 3'') mounted on the second side wall (2, 2''), wherein the base frame (200) with its transverse walls (2B) and its side walls (2; 2', 2'') has a rectangular cross-section, a cross-sectional area thereof defining a plane transverse to an insertion direction (R4) of the connector modules (4); and wherein the holding frame (1) has both a cable connection side opening (10) and opposite thereto a plug-side opening (100); and wherein the integral latch and spring elements (3, 3', 3'') each have at least one reversibly bendable holding and guiding portion (3231) for inserting a connector module (4) and for holding of the inserted connector module (4) and a fixing portion (33) for its own (3; 3', 3'') fixation on the respective side wall (2; 2', 2''); and wherein at each holding and guiding portion (3231) a latch (30) is formed which has a holding contour (K30; K30', K30'') with which a holding and guiding contour (K4; K4', K4'') of the connector module (4) inserted into the holding frame (1) is latched while the connector module (4) is held in the holding frame (1); and wherein the holding frame (1) has a plurality of first (3') and a plurality of second (3''') latch and spring elements which have an identical and/or a different number of holding and guiding portions (3231); and wherein the plurality of first latch and spring elements (3') each have one or more holding and guiding portions (3231) with a first side contour (K32') and a first fixing contour (K33'); and wherein the plurality of second latch and spring elements (3'') each have one or more holding and guiding portions (3231) with a second side contour (K32''') and a second fixing contour (K33''); and wherein the plurality of holding frames (1) differ from each other by a number of their latching regions (20) and by the number of their holding and guiding portions (3231).

19. The System according to claim 18, wherein the holding frames (1) additionally differ from each other by a number of their first (K3') and/or second (K3'') fixing contours.

20. A connector, comprising:

a holding frame (1), including a base frame (200) having two longitudinal side walls (2, 2', 2'') parallel opposite to each other, namely a first side wall (2, 2') and a second side wall (2, 2'''), two mutually parallel transverse walls (2B) at right angles, and integral latch and spring elements (3, 3', 3''), including at least one first latch and spring element (3, 3'') mounted on the first side wall (2, 2''), and at least one second latch and spring element (3, 3'') mounted on the second side wall (2, 2'');

a mounting housing (5); and a plurality of connector modules (4), wherein the holding frame (1) when installed in the mounting housing (5) is inserted and fixed therein, and wherein the base frame (200) with its transverse walls (2B) and its side walls (2; 2', 2'') has a rectangular cross-section, a cross-sectional area thereof defining a plane transverse to an insertion direction (R4) of the connector modules (4), and wherein the holding frame (1) has both a cable connection side opening (10) and opposite thereto a plug-side opening (100), and wherein the integral latch and spring elements (3, 3', 3''') each have at least one reversibly bendable holding and guiding portion (3231) for inserting a connector module (4) and for holding of the inserted connector module (4) and a fixing portion (33) for its own (3; 3', 3'') fixation on the respective side wall (2; 2', 2''), and wherein at each holding and guiding portion (3231) a latch (30) is formed which has a holding contour (K30; K30', K30'') with which a holding and guiding contour (K4; K4', K4'') of the connector module (4) inserted into the holding frame (1) is latched while the connector module (4) is held in the holding frame (1), wherein the connector modules (4) are insertable in the holding frame (1) and can be removed from the holding frame (1) individually and independently of each other on the cable connection side while the holding frame (1) is built into the connector.

* * * * *